(12) United States Patent
Takahashi et al.

(10) Patent No.: US 8,306,160 B2
(45) Date of Patent: Nov. 6, 2012

(54) SYNCHRONIZATION CIRCUIT AND SYNCHRONIZATION METHOD, WIRELESS COMMUNICATION DEVICE AND WIRELESS COMMUNICATION METHOD, AND COMPUTER PROGRAM

(75) Inventors: Hiroaki Takahashi, Kanagawa (JP); Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 627 days.

(21) Appl. No.: 12/533,582

(22) Filed: Jul. 31, 2009

(65) Prior Publication Data

US 2010/0061493 A1 Mar. 11, 2010

(30) Foreign Application Priority Data

Sep. 9, 2008 (JP) ................................ 2008-230451

(51) Int. Cl.
H03D 1/00 (2006.01)
(52) U.S. Cl. ...................... 375/343; 370/331; 375/260
(58) Field of Classification Search .................. 370/208, 370/331, 503; 375/260, 340, 343, 354
See application file for complete search history.

(56) References Cited

U.S. PATENT DOCUMENTS

| 2003/0072255 | A1 | 4/2003 | Ma et al. | |
|---|---|---|---|---|
| 2004/0076246 | A1 | 4/2004 | Vanderperren et al. | |
| 2005/0180364 | A1* | 8/2005 | Nagarajan et al. | 370/335 |
| 2006/0222099 | A1* | 10/2006 | Varadarajan et al. | 375/260 |
| 2006/0233288 | A1 | 10/2006 | Gruijters et al. | |
| 2007/0110174 | A1 | 5/2007 | Glazko et al. | |
| 2007/0189150 | A1* | 8/2007 | Kasami | 370/208 |
| 2008/0039107 | A1* | 2/2008 | Ma et al. | 455/450 |
| 2008/0212603 | A1* | 9/2008 | Chiu et al. | 370/430 |
| 2011/0096751 | A1* | 4/2011 | Ma et al. | 370/331 |

FOREIGN PATENT DOCUMENTS

| JP | 2002-232385 | 8/2002 |
|---|---|---|
| JP | 2003-69546 | 3/2003 |
| JP | 2004-56552 | 2/2004 |
| JP | 2004-221940 | 8/2004 |
| JP | 2004-241974 | 8/2004 |
| JP | 2005-65197 | 3/2005 |
| JP | 2005-506757 | 3/2005 |
| JP | 2005-168000 | 6/2005 |
| JP | 2005-223575 | 8/2005 |
| JP | 2006-504359 | 2/2006 |
| JP | 2006-229503 | 8/2006 |

(Continued)

OTHER PUBLICATIONS

Office Action issued Nov. 24, 2010, in Japan Patent Application No. 2008-230451.

*Primary Examiner* — Leon-Viet Nguyen
(74) *Attorney, Agent, or Firm* — Oblon, Spivak, McClelland, Maier & Neustadt, L.L.P.

(57) ABSTRACT

A synchronizing circuit comprising: a coarse synchronizing circuit which determines temporary reception timing using a preamble consisting of a repetition of known training signals added to a reception packet; a synchronization candidate timing control section which sets up multiple synchronization candidates based on the temporary reception timing and controls synchronization of received signal s in each of the multiple synchronization candidates; a signal quality monitoring section which monitors signal quality of the received signal s synchronized in each of the multiple synchronization candidates; and a synchronization candidate selecting section which selects one of the synchronization candidates as a final reception timing based on a monitoring result of the signal quality in the signal quality monitoring section.

20 Claims, 18 Drawing Sheets

FOREIGN PATENT DOCUMENTS

| | | |
|---|---|---|
| JP | 2007-68210 | 3/2007 |
| JP | 2007-519290 | 7/2007 |
| JP | 2007-221187 | 8/2007 |
| JP | 2007-324704 | 12/2007 |
| JP | 2008-153775 | 7/2008 |
| JP | 2008-182533 | 8/2008 |
| JP | 2009-516483 | 4/2009 |
| WO | WO 2007/029579 A1 | 3/2007 |

* cited by examiner

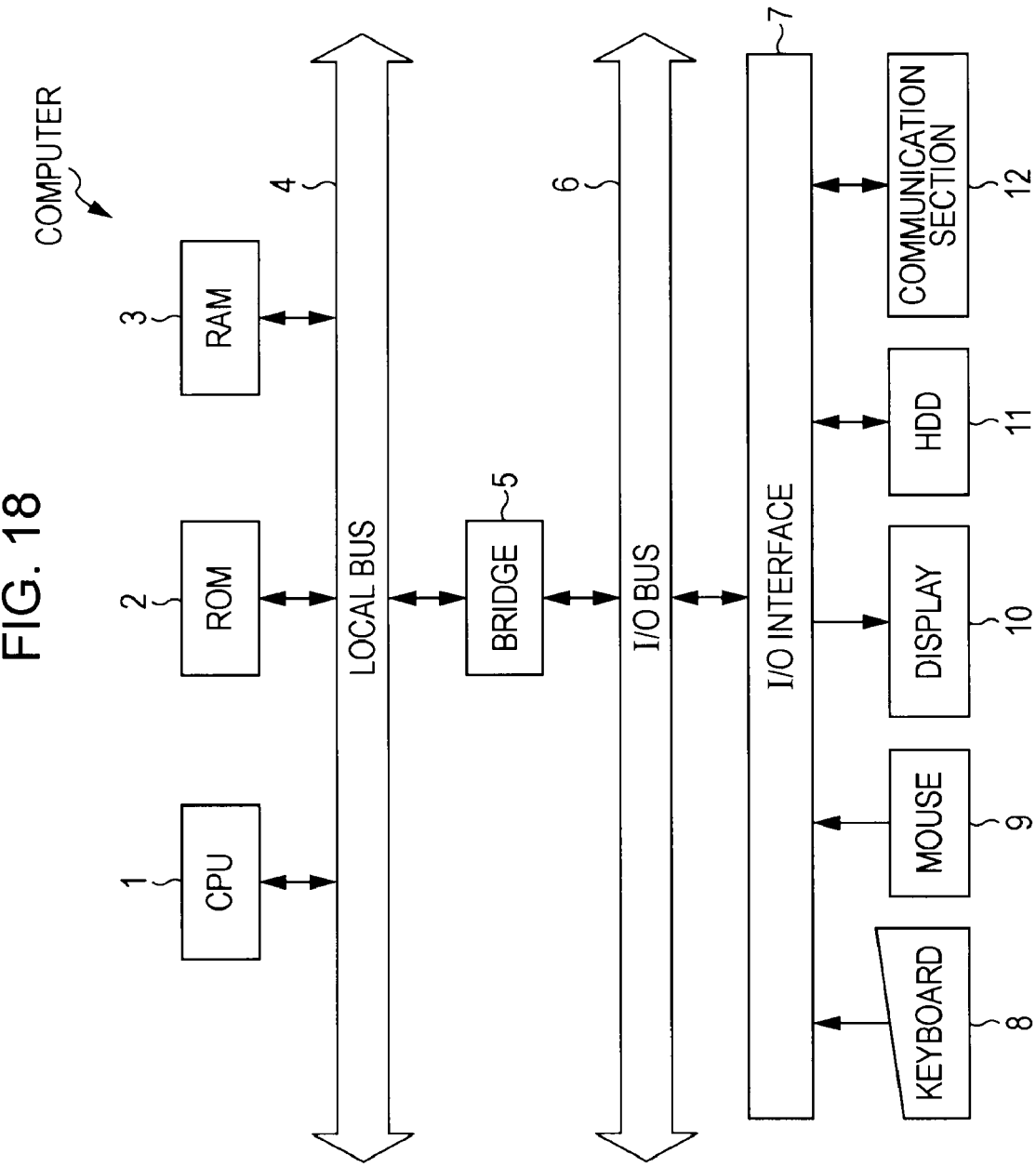

SYNCHRONIZATION CIRCUIT AND SYNCHRONIZATION METHOD, WIRELESS COMMUNICATION DEVICE AND WIRELESS COMMUNICATION METHOD, AND COMPUTER PROGRAM

BACKGROUND OF THE INVENTION

1. Field of the Invention

The present invention relates to a synchronization circuit and a synchronization method in which a packet is detected using a preamble of a packet received from a communication partner and synchronization processing is performed. The invention also relates to a wireless communication device and a wireless communication method in which a reception operation is performed on the basis of a synchronization result using the packet preamble, and a computer program. More particularly, the invention relates to a synchronization circuit and a synchronization method, a wireless communication device and a wireless communication method and a computer program that detect exact reception timing using the preamble of a packet in a receiver with a plurality of reception branches.

More particularly, the invention relates to a synchronization circuit and a synchronization method, a wireless communication device and a wireless communication method and a computer program that detect exact reception timing without increases in circuit size and power consumption for the detection of the reception timing. More particularly, the invention relates to a synchronization circuit and a synchronization method, a wireless communication device and a wireless communication method and a computer program that detect exact reception timing without using crosscorrelation for the packet preamble.

2. Description of the Related Art

Wireless networks are now attracting attention as novel communication systems to replace wired communication systems. Exemplary standards for wireless networks may include I institute of Electrical and Electronics Engineers (IEEE) 802.11 and IEEE802.15. IEEE802.11a/g is a standard of wireless LANs employing orthogonal frequency division multiplexing (OFDM) modulation, which is a multi-carrier system.

In a wireless communication system with OFDM modulation, transmitted data is subject to serial-parallel conversion and inverse discrete fast Fourier transform (IFFT) at a transmitter side to collectively modulate orthogonal subcarriers. At the transmitter side, a training signal used for synchronization called a "preamble" is added in bursts to heads of modulation signals having an IFFT-processed frame structure, which are then transmitted. At a receiver side, normalization (setup of automatic gain control (AGC) of received signal electric power, frequency offset correction, detection of reception timing and other processes are conducted using the received preamble. A FFT window is provided based on the detected timing and a discrete fast Fourier transform (FFT) operation is performed.

Detection accuracy of the reception timing has significant influence on reception performance. In the OFDM modulation system, it is necessary to optimize timing of performing FFT operations on received symbols. Mistiming in FFT operations may cause intersymbol interference and symbol rotation, which may result in impaired reception performance.

The reception timing is detected using the training signal, i.e., the preamble, transmitted in bursts using the packet head. A receiver can detect the reception timing through autocorrelation or crosscorrelation using the preamble based on the time when a correlation result exceeds a certain threshold.

Autocorrelation is a process for finding a correlation between repeated signals included in the preamble. Crosscorrelation is a process for finding correlation between a known data string and an input data string. Autocorrelation is useful even in the presence of reflection or fading, but may disadvantageously correlate data and even noise other than the preamble. Crosscorrelation does not detect correlations with noise or unrelated data, but its correlation peak may become smaller upon changes in received waveforms due to large variation in reception frequency, reflection or fading (for example, see Japanese Unexamined Patent Application Publication (JP-A) No. 2003-69546, paragraph 0007).

A method of extracting exact reception timing has been proposed in which rough reception timing (i.e., temporary reception timing) is first determined through autocorrelation in with the first half of the preamble and then reception timing is determined through crosscorrelation in a time window calculated based mainly on the temporary reception timing in the second half of the preamble (for example, see JP-A-2003-69546, paragraph 0007).

FIG. 15 illustrates a frame format of IEEE802.11a/g. FIG. 16 illustrates a preamble configuration provided by IEEE802.11a/g. As shown in the drawings, a short training field (STF) of 8.0 microseconds and a long training field (LTF) of 8.0 microseconds are added to the heads. In the short training field, short preambles t1 to t10 including short training sequences (STS) are sent in bursts, i.e., repeatedly sent 10 times. In the long training field, after a 1.6 microseconds of guard interval GI2, long preambles T1 and T2 including long training sequences (LTS) are sent twice.

The receiver may be autocorrelated between known training sequences STS usually included repeatedly in the STF and may determine a peak position of (the square of) the absolute value of autocorrelation as temporary reception timing. Autocorrelation may be calculated through, for example, cumulative addition or a moving average of a complex conjugate multiplication result of a received signal and a delayed signal received before the received signal by one repeating cycle.

In the subsequent LTF, the receiver may extract exact reception timing through crosscorrelation in time window based mainly on the temporary reception timing. As shown in FIG. 16, in the LTF, a known signal LTS of 3.2 microseconds is repeated 2.5 times during transmission. That is, the LTF configuration includes 3.2 microseconds×2.5 times=8 microseconds. The receiver then keeps a LTF table with a length of 3.2 microseconds and calculates crosscorrelation between this known LTF table and the temporary reception timing which is considered to be the LTF of the received signal.

In this manner, the cross correlation peak value as shown in FIG. 17 can be detected. Since the known signal LTS of 3.2 microseconds is repeated 2.5 times in the LTF, two peaks should be formed in a precise sense. Rough synchronization may be made in advance with the STF, a crosscorrelation circuit that detects exact timing may be provided so as to find only the first peak of the head of the LTF. A subsequent demodulation process and a FFT process may be conducted using the synchronization points determined on the basis of the peak position shown in FIG. 17.

Although the IEEE802.11a/g standard supports a modulating system which achieves a transmission speed of 54 Mbps at the maximum, there is an increasing demand for a higher bit rate next-generation wireless LAN standard. IEEE802.11n, which is an extended standard of IEEE802.11, employs a multiple input multiple output (OFDM_MIMO) communication system which performs transmission beam forming in accordance with channel characteristics in a multiantenna system.

In a MIMO receiver with multiple reception branches, an LTF crosscorrelation circuit may be mounted for each reception branch in a synchronizing circuit for performing exact reception timing. In this system, for example, the LTF cross correlation circuits for three branches are mounted and representative synchronization timing is selected from synchronization timing detected at each branch. However, the circuit for calculating crosscorrelation values is significantly large in scale, thereby increasing the manufacturing cost of the system and power consumption.

Alternatively, the receiver may only detect the synchronization timing by using the STF and detection of exact synchronization timing by the LTF may be omitted. It is clear, however, that accuracy in synchronization timing is low and reception performance may be impaired by inter symbol interference or symbol rotation.

It is desirable to provide an improved synchronization circuit and a synchronization method in which a packet is detected using a packet preamble received from a communication partner and synchronization processing is performed. It is also desirable to provide an improved wireless communication device and a wireless communication method and a computer program in which a packet is received based on a synchronization result using the packet preamble.

It is further desirable to provide an improved synchronization circuit and a synchronization method, a wireless communication device and a wireless communication method and a computer program for detecting exact reception timing using the packet preamble in a receiver with multiple reception branches.

It is yet further desirable to provide an improved synchronization circuit and a synchronization method, a wireless communication device and a wireless communication method and a computer program for detection of exact reception timing without increase in circuit size and power consumption for the detection of the reception timing.

It is still further desirable to provide an improved synchronization circuit and a synchronization method, a wireless communication device and a wireless communication method and a computer program for detection of exact reception timing without using crosscorrelation for the packet preamble.

SUMMARY OF THE INVENTION

The invention has been made in view of the aforementioned. According to an embodiment of the invention, there is provided a synchronizing circuit which includes: a coarse synchronizing circuit which determines temporary reception timing using a preamble consisting of known training signals added to a received packet; a synchronization candidate timing control section which sets up multiple synchronization candidates on the basis of the temporary reception timing and controls synchronization of received signal s in each of the multiple synchronization candidates; a signal quality monitoring section which monitors signal quality of the received signals synchronized in each of the multiple synchronization candidates; and a synchronization candidate selecting section which selects one of the synchronization candidates as a final reception timing on the basis of a monitoring result of the signal quality in the signal quality monitoring section.

The coarse synchronizing circuit may determine temporary reception timing through autocorrelation of the preamble of the reception packet.

The synchronization candidate timing control section may set up multiple synchronization candidates at or around the temporary reception timing and control synchronization of the received signals in each of the multiple synchronization candidates.

The synchronization candidate selecting section may select a synchronization candidate with the best quality as a final reception timing based on predetermined selection criteria.

The synchronizing circuit may be applied to a receiver with multiple reception branches. In this case, the synchronization candidate timing control section may assign, to each of the multiple reception branches, the received signals of which synchronization timing is controlled with each of the multiple synchronization candidates. The signal quality monitoring section may monitor the signal quality of the received signal in each of the multiple reception branches. The synchronization candidate selecting section may select, as final reception timing, a synchronization candidate corresponding to a reception branch in which the received signal has the best quality based on predetermined selection criteria.

The synchronization candidate timing control section may control synchronization of the preamble of the received packet with each of the multiple synchronization candidates. The signal quality monitoring section may monitor the signal quality for the preamble synchronized with each of the multiple synchronization candidates.

The signal quality monitoring section may estimate each channel matrix from the received preamble synchronized with each of the multiple synchronization candidates and monitor a matrix norm of an inverse matrix of each channel matrix as the signal quality. The synchronization candidate selecting section may select, as the final reception timing, a synchronization candidate used for synchronization of the received signal with the smallest norm.

The synchronizing circuit may be applied to an orthogonal frequency division multiplexing (OFDM) modulation receiver. In this case, the signal quality monitoring section may monitor, as the signal quality, an amount of phase rotation after a FFT operation of the received preamble synchronized with each of the multiple synchronization candidates. The synchronization candidate selecting section may select, as the final reception timing, a synchronization candidate used for synchronization of the received signal with the smallest amount of phase rotation.

The signal quality monitoring section may monitor, as the signal quality, likelihood obtained during decoding of the received signal synchronized with each of the multiple synchronization candidates. The synchronization candidate selecting section may select, as the final reception timing, a synchronization candidate used for synchronization of the received signal with the highest likelihood.

The signal quality monitoring section may monitor, as the signal quality, an error rate before decoding of a known received signal synchronized with each of the multiple synchronization candidates. The synchronization candidate selecting section may select, as the final reception timing, a synchronization candidate used for synchronization of the received signal with the lowest error rate.

The signal quality monitoring section may monitor, as the signal quality, an error rate after decoding of a known received signal synchronized with each of the multiple synchronization candidates. The synchronization candidate selecting section may select, as the final reception timing, a synchronization candidate used for synchronization of the received signal with the lowest error rate.

The signal quality monitoring section may monitor, as the signal quality, noise estimated from the received preamble synchronized with each of the multiple synchronization candidates. The synchronization candidate selecting section may select, as the final reception timing, a synchronization candidate used for synchronization of the received signal with the lowest noise.

The synchronizing circuit may be applied to an OFDM modulation receiver. In this case, the preamble of the packet may have a 1/N bandwidth of a fast Fourier transform (FFT) operation bandwidth (N is a positive number). The synchronization candidate timing control section may set up M synchronization candidates for each reception branch (M is a positive integer of from 2 to N), control synchronization timing with each of the multiple synchronization candidates, and shift frequency of (M−1) received signals so that all of the received signals are arranged within the FFT operation bandwidth and assigned to a single reception branch. The signal quality monitoring section may monitor the signal quality of the received signal after the FFT operation in the reception branch. The synchronization candidate selecting section may select, as the final reception timing, a synchronization candidate corresponding to a reception branch in which the received signal has the best quality based on predetermined selection criteria.

The preamble used to determine the final reception timing may consist of N or greater numbers of repetition of known training signals (N is a positive number). The synchronization candidate timing control section may set up M synchronization candidates for each reception branch (M is a positive integer of from 2 to N), and assign, to a single reception branch, M received signals in which a preamble of K-th repetition of which synchronization timing is controlled with K-th synchronization candidate (K is a positive integer from 1 to M).

According to another embodiment of the invention, there is provided a synchronizing method which includes the steps of: coarse synchronizing for determining temporary reception timing using a preamble consisting of a repetition of known training signals added to a received packet; controlling synchronization candidate timing for setting up multiple synchronization candidates based on the temporary reception timing and controlling synchronization of received signals in each of the multiple synchronization candidates; monitoring signal quality for monitoring signal quality of the received signals synchronized in each of the multiple synchronization candidates; and selecting a synchronization candidate for selecting one of the synchronization candidates as a final reception timing based on a monitoring result of the signal quality in the signal quality monitoring section.

According to a yet another embodiment of the invention, there is provided a wireless communication device which includes: a reception section which receives a packet with a preamble consisting of a repetition of known training sequences added at the head; and a synchronizing circuit which includes: a coarse synchronizing circuit which determines temporary reception timing using a received preamble; a synchronization candidate timing control section which sets up multiple synchronization candidates based on the temporary reception timing and controls synchronization of received signals in each of the multiple synchronization candidates; a signal quality monitoring section which monitors signal quality of the received signals synchronized in each of the multiple synchronization candidates; and a synchronization candidate selecting section which selects one of the synchronization candidates as a final reception timing based on a monitoring result of the signal quality in the signal quality monitoring section, wherein a reception process is conducted in which information signals received after the preamble are synchronized at the final reception timing.

According to a further embodiment of the invention, there is provided a wireless communication method which includes the steps of: reception a packet with a preamble consisting of a repetition of known training sequences added at the head; synchronizing, which includes: determining temporary reception timing using a received preamble; setting up multiple synchronization candidates based on the temporary reception timing and controlling synchronization of received signals in each of the multiple synchronization candidates; and monitoring signal quality of the received signals synchronized in each of the multiple synchronization candidates; and selecting one of the synchronization candidates as a final reception timing based on a monitoring result of the signal quality; and conducting a reception process in which information signals received after the preamble are synchronized at the final reception timing.

According to a still further embodiment of the invention, there is provided a computer program described in a computer-readable format such that a process for timing reception of a packet is executed on a computer, the program causing the computer to function as: a coarse synchronizing circuit which determines temporary reception timing using a preamble consisting of a repetition of known training signals added to a received packet; a synchronization candidate timing control section which sets up multiple synchronization candidates based on the temporary reception timing and controls synchronization of received signals in each of the multiple synchronization candidates; a signal quality monitoring section which monitors signal quality of the received signals synchronized in each of the multiple synchronization candidates; and a synchronization candidate selecting section which selects one of the synchronization candidates as a final reception timing based on a monitoring result of the signal quality in the signal quality monitoring section.

The computer program according to an embodiment of the invention defines a computer program described in a computer-readable format to perform a predetermined process on a computer system. That is, the computer program according to an embodiment of the invention may be installed in a computer program to provide a cooperative effect on the computer. The computer program may therefore provide an operation effect similar to that of the synchronizing circuit according to an embodiment of the invention.

According to the embodiments of the invention, an improved synchronization circuit and a synchronization method, a wireless communication device and a wireless communication method and a computer program for detecting exact reception timing using the packet preamble in a receiver with multiple reception branches may be provided.

According to the embodiments of the invention, an improved synchronization circuit and a synchronization method, a wireless communication device and a wireless communication method and a computer program for detection of exact reception timing without increase in circuit size and power consumption for the detection of the reception timing may be provided.

According to the embodiments of the invention, an improved synchronization circuit and a synchronization method, a wireless communication device and a wireless communication method and a computer program for detection of exact reception timing without using crosscorrelation for the packet preamble may be provided.

According to the first to fourth and fifteenth to eighteenth embodiments of the invention, after the rough, temporary reception timing is determined through, for example, autocorrelation of the preamble of the received packet, multiple synchronization candidates may be set up at or around the temporary reception timing to control synchronization of the received signals in each of the multiple synchronization candidates. The synchronization candidate synchronized at each of the multiple synchronization candidates in which the received signal has the best quality may be selected as the final reception timing. Thus, exact reception timing may be detected without using crosscorrelation for the preamble.

According to the fifth embodiment of the invention, in the receiver of multiantenna configuration, such as the MIMO communication, the received signals of which synchronization timing is controlled with each of the multiple synchronization candidates may be assigned to each of the multiple reception branches, the signal quality of the received signal synchronized with each of the multiple synchronization candidates may be monitored in parallel at each of the reception branches (i.e., different synchronization candidates may be processed at the same time). The synchronization candidate corresponding to the reception branch in which the reception branch has the best quality may be selected as the final reception timing based on predetermined selection criteria.

According to the sixth embodiment of the invention, since the synchronization candidate timing control section controls synchronization of the preamble of the received packet with each of the multiple synchronization candidates, and the signal quality monitoring section monitors the signal quality for the preamble synchronized with each of the multiple synchronization candidates, the exact synchronization timing may be determined using the STF (L-TSF) and LTF (L-LTF) having a common configuration for all the communication modes among the preambles provided by IEEE802.11a/n.

According to the seventh embodiment of the invention, the matrix norm of the inverse matrix of the channel matrix of the received preamble synchronized with each of the multiple synchronization candidates may be monitored as the signal quality. The synchronization candidate used for synchronization of the received signal having the smallest norm may be selected as the final reception timing.

According to the eighth embodiment of the invention, the amount of phase rotation after the FFT operation of the received preamble synchronized with each of the multiple synchronization candidates may be monitored as the signal quality, and the synchronization candidate used for synchronization of the received signal with the smallest norm may be selected as the final reception timing.

According to the ninth embodiment of the invention, likelihood obtained during decoding of the received signal synchronized with each of the multiple synchronization candidates may be monitored as the signal quality and the synchronization candidate used for synchronization of received signal with the highest likelihood may be selected as the final reception timing.

According to the tenth embodiment of the invention, the error rate (BER) obtained before decoding the known received signal synchronized with each of the multiple synchronization candidates (e.g., the STF (L-TSF) and LTF (L-LTF) having a common configuration for all the communication modes among the preambles provided by IEEE802.11a/n) may be monitored as the signal quality. The synchronization candidate used for synchronization of the received signal having the lowest error rate may be selected as the final reception timing.

According to the eleventh embodiment of the invention, the error rate (BER) obtained after decoding the known received signal synchronized with each of the multiple synchronization candidates (e.g., the STF (L-TSF) and LTF (L-LTF) having a common configuration for all the communication modes among the preambles provided by IEEE802.11a/n) may be monitored as the signal quality. The synchronization candidate used for synchronization of the received signal with the lowest error rate may be selected as the final reception timing.

According to the twelfth embodiment of the invention, noise estimated from the received preamble synchronized with each of the multiple synchronization candidates may be monitored as the signal quality. The synchronization candidate used for synchronization of the received signal with the lowest noise may be selected as the final reception timing.

According to the thirteenth embodiment of the invention, accuracy in timing detection may be improved by assigning multiple synchronization candidates arranged in the frequency axis direction to a single reception branch and selecting more suitable reception timing from the synchronization candidates greater in number than that of the reception branches.

In particular the bandwidth of the L-LTF is 20 MHz, which is the upper or lower half (upper bandwidth or lower bandwidth) of the full bandwidth (40 MHz). Accordingly, a bandwidth of one of the two received L-LTFs synchronized with different synchronization candidates may be shifted to the other unused 20 MHz bandwidth (lower bandwidth or upper bandwidth) so that both the L-LTFs may be placed within the bandwidth of the FFT operation. In this manner, the synchronization candidates may be selected at a single reception branch.

According to the fourteenth embodiment of the invention, accuracy in timing detection may be improved by assigning multiple synchronization candidates arranged in the temporal axis direction to a single reception branch and selecting more suitable reception timing from the synchronization candidates greater in number than that of the reception branches.

Other objects, feathers and advantages of the invention will become more apparent as the description proceeds in conjunction with the accompanying drawings.

BRIEF DESCRIPTION OF THE DRAWINGS

FIG. 18 illustrates an exemplary configuration of a computer incorporating a wireless communication system.

DESCRIPTION OF THE PREFERRED EMBODIMENTS

Figure 1:
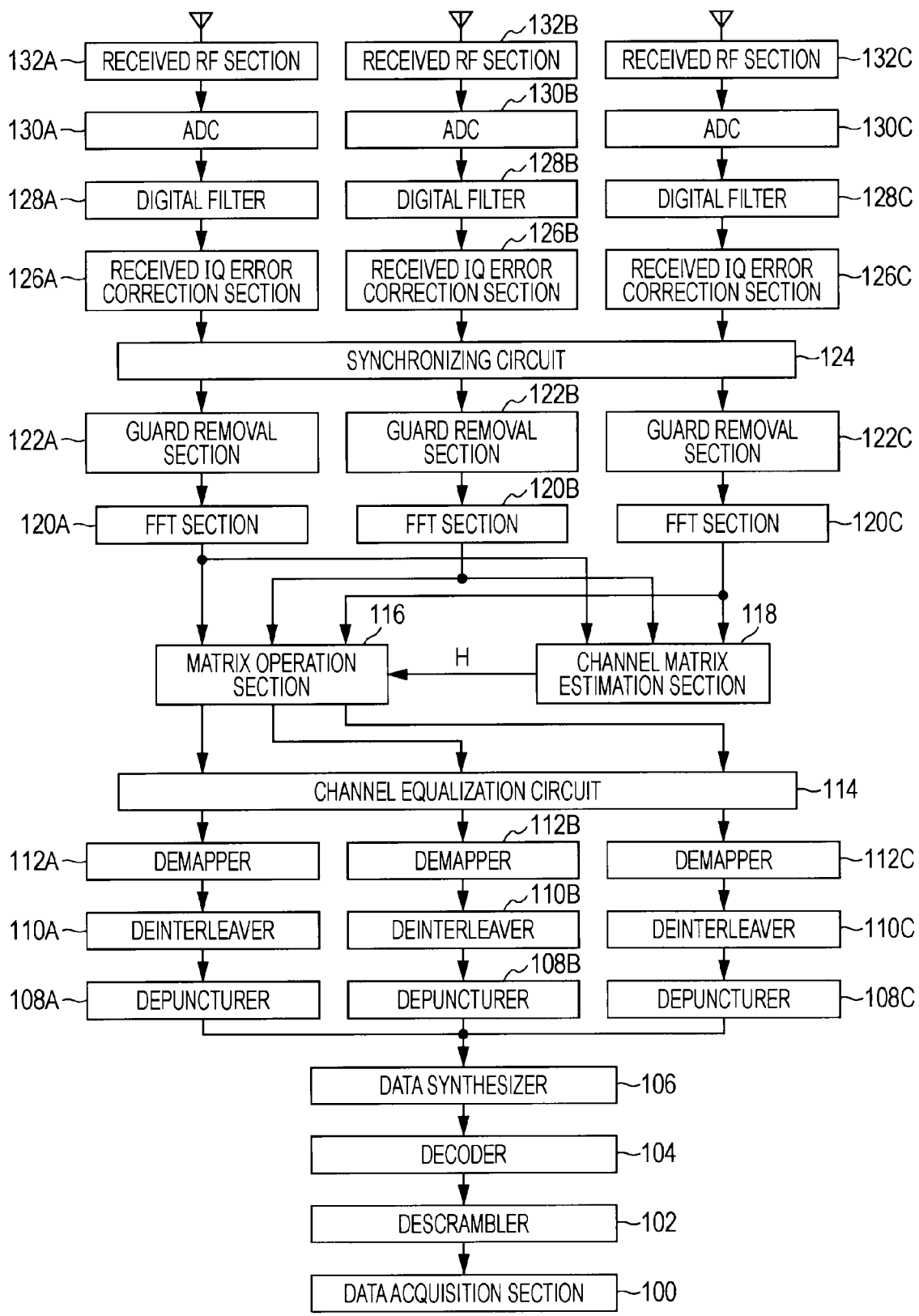
FIG. 1 illustrates an exemplary configuration of receiver according to an embodiment of the invention.

Referring now to the drawings, embodiments of the invention will be described in detail.

FIG. 18 illustrates an exemplary configuration of a computer which incorporates a wireless communication system.

A CPU 1 executes programs stored in a read only memory (ROM) 2 or a hard disk drive 11 under a program execution environment provided by an operating system (OS). For example, received packets which will be described later may be synchronized or partly synchronized by the CPU 1 executing a predetermined program.

The ROM 2 permanently stores program codes, such as power on self test (POST) and a basic input output system (BIOS). The RAM 3 is used for loading programs stored in the ROM 2 or the HDD 11 to be executed by the CPU 1. The RAM 3 also temporarily keeps work data of the program being executed. These components are mutually connected by a local bus 4 coupled directly to a local pin of the CPU 1.

The local bus 4 is connected to an I/O bus 6, such as a peripheral component interconnect (PCI) bus, via a bridge 5.

A keyboard 8 and a pointing device 9, such as a mouse, are input devices operated by the user. A display 10 may be a liquid crystal display (LCD) or a cathode ray tube (CRT) for displaying various information as text or images.

A HDD 11 is a drive unit which incorporates and drives a hard disk as a storage medium. Programs to be executed by the CPU 1, such as an operating system and various applications, may be installed in the hard disk. Data files may be stored in the hard disk.

A communication section 12 is a wireless communication interface provided by, for example, IEEE802.11a/n. The communication section 12 operates as an access point or a terminal station under an infrastructure mode, or operates under an ad-hoc mode, to communicate with other communication terminals existing in a communication range.

FIG. 1 schematically illustrates an exemplary configuration of a receiver within the communication section 12 provided in the computer shown in FIG. 18. Since the subject of the invention is not directly related to the configuration of the transmitter, description thereof will be omitted.

A receiver shown in FIG. 1 is a MIMO receiver which includes multiple antennas used for transmission beam forming in accordance with channel characteristics. The receiver operates as a beamformee which receives beamformed signals transmitted from a MIMO transmitter (not shown). In the illustrated example, three reception branches are provided for ease of description. The number of reception branches, however, is not particularly limited.

Figure 2:
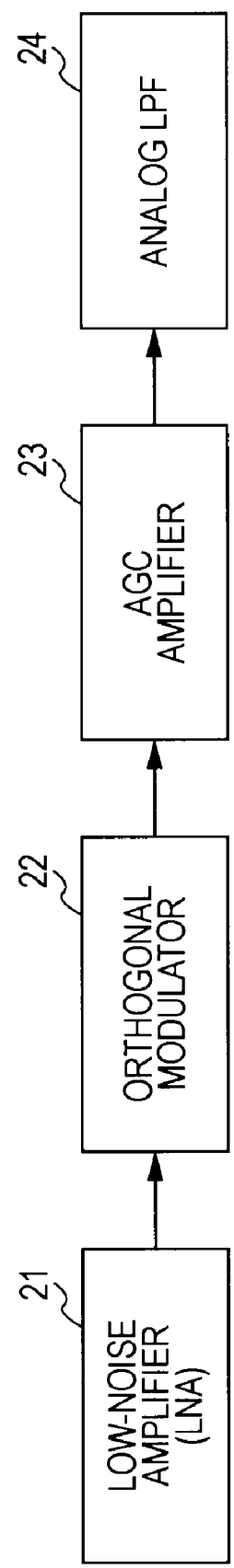
FIG. 2 illustrates an exemplary configuration in an RF section 130 for each reception branch.

Beam-formed transmitted signals are transmitted from the communication partner having multiple transmission antennas. The signals received at N reception antennas are subjected to analog processing by reception RF sections 132A to 132C at each reception antenna branch. FIG. 2 illustrates an exemplary configuration in the reception RF section 132 provided for each reception branch. The illustrated reception RF section 132 may include a low-noise amplifier (LNA) 21, an orthogonal demodulator (IQ demodulator) 22 which down converts the received signal in an RF frequency band, an AGC amplifier 23 which normalizes the electric power of the received signal to be within a dynamic range of a subsequent AD converter (analog to digital converter: ADC) 128, and an analog low-pass filter (LPF) 24 which removes signal components in other bandwidths than desired.

The analog received signals are converted into digital signals by AD converters 130A to 130C and then input into digital filters 128A to 128C for band regulation.

Reception IQ error correction sections 126A to 126C correct an IQ error. The IQ error herein includes an IQ amplitude error resulting from variation in amplitudes of I (In-phase) channel signals and Q (Quadrature) channel signals in an IQ demodulator of a down converter, and an IQ phase error resulting from displacement of the I-axis and the Q-axis by 90 degrees. If the IQ error is not corrected, the error vector magnitude (EVM) of the received signal becomes small, resulting in inferior communication quality.

Subsequently, synchronizing circuit 124 determines rough reception timing (i.e., temporary reception timing) is determined based on detection of a packet (i.e., detection of signals corresponding to the preamble). The synchronizing circuit 124 also corrects the frequency offset, estimates noise and extracts more exact reception timing using temporary reception timing.

Guard removal sections 122A to 122C remove guard intervals added to the head of the data transmitting section. Then, fast Fourier transform sections (FFT) 120A to 120C perform an FFT operation by providing FFT windows on the basis of the reception timing obtained in the synchronizing circuit, and convert the received signal s on a temporal axis into frequency axis signals.

A channel matrix estimation section 118 estimates a channel matrix from known training signals (L-LTF) received at each of the reception branches. A channel matrix H herein is a numerical matrix consisting of channel information corresponding to a pair of transmitting and reception antennas. The channel information is a transfer function having a phase and amplitude as components.

A matrix operation section 116 performs space separation of the beam-formed received signals. In particular, the matrix operation section 116 calculates a reception weight matrix W of the antenna on the basis of the channel matrix H estimated in the channel matrix estimation section 118. The matrix operation section 116 then performs matrix multiplication of the reception vector having the received signal s for each reception branch as an element and the antenna reception weight matrix W to perform space decoding of the beam-formed space multiple signals and obtain independent received signal s (i.e., signals with no crosstalk). Here, a Minimum Mean Square Error (MMSE) algorithm may be used to calculate the antenna reception weight W from the channel matrix H. Alternatively, singular value decomposition (SVD), eigenvalue decomposition (EVD) or other matrix decomposition may be used.

A channel equalization circuit 114 performs residual frequency offset correction and channel tracking for each space-separated received signal. For example, the channel equalization circuit 114 may make a correction (i.e., waveform equalization in frequency domains) to information signals after L-SIG, which include pilot signals having a known fixed pattern by calculating a residual frequency offset amount or a phase offset amount on the basis of the known signals. JP-A-2006-186732 assigned to the present assignee discloses a method of residual frequency offset correction and phase correction to the received signal s which are space-separated by the matrix operation.

Demappers 112A to 112C demap the received signal in the IQ signal space. Deinterleavers 110A to 110C deinterleave. Depuncturers 108A to 108C depuncture at a predetermined data rate. A data synthesizer 106 synthesizes multiple reception streams to a single stream. The data synthesis is a completely reverse process of data distribution at the transmitter side. Subsequently, the decoder 104 performs a maximum likelihood sequence estimation process in a soft decision decoding system, such as Viterbi decoding, to estimate a reception bit series. A descrambler 102 then descrambles. A data acquisition section 100 acquires the reception data.

Figure 3:
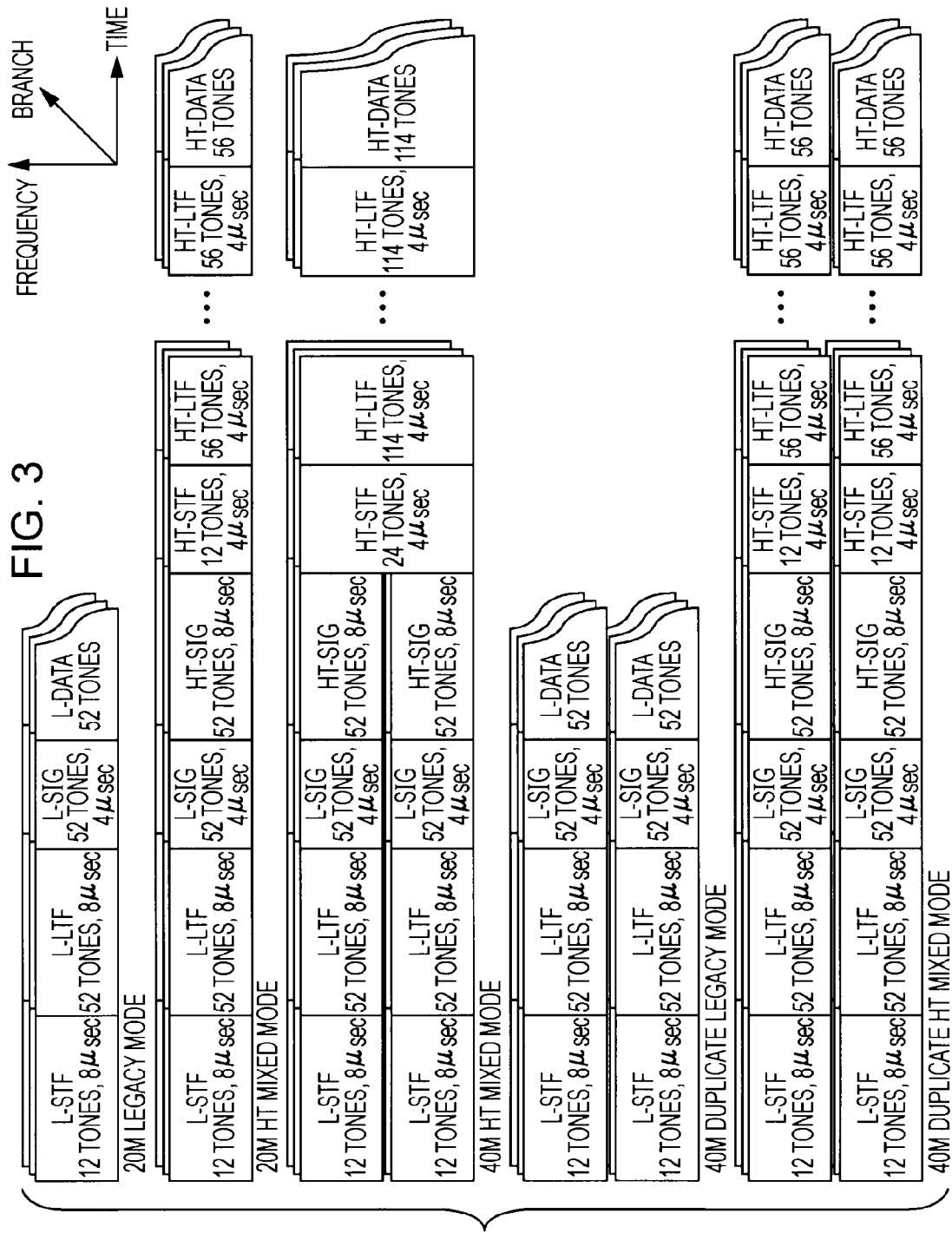
FIG. 3 illustrates a packet format of IEEE802.11n.

A PHY layer of IEEE802.11n which employs OFDM_MIMO communication has a high throughput (HT) transmission mode (hereinafter, referred to as a "HT mode") which has a Modulation and Coding Scheme (MCS), such as modulating system and encoding system, that is completely different from the related art IEEE802.11a/g. The PHY layer also has an operational mode (hereinafter, referred to as "legacy mode") for performing data communication in the same packet format and the same frequency domain as those of the related art IEEE802.11a/g. The HT mode also includes an operational mode called "Mixed Mode (MM)" having compatibility with related art terminals (hereinafter, referred to as "legacy terminal") based on IEEE802.11a/g. IEEE802.11n has five packet formats as shown in FIG. 3. One OFDM symbol corresponds to 4 microseconds.

(1) 20-MHz-band Legacy Mode (in the illustrated example, 3×3×1 configuration)

(2) 20-MHz-band HT Mixed Mode (in the illustrated example, 3×3×N configuration)

(3) HT Mixed Mode having extended bandwidth of 40 MHz band (in the illustrated example, 3×3×N configuration)

(4) 40 M Duplicate Legacy Mode which uses lower 20 MHz band (lower bandwidth) and upper 20 MHz band (upper bandwidth) of 40 MHz band in an overlapped manner (in the illustrated example, 3×3×1 configuration)

(5) 40 M Duplicate HT MixedMode which uses lower 20 MHz band (lower bandwidth) and upper 20 MHz band (upper bandwidth) of 40 MHz bands in an overlapped manner (in the illustrated example, 3×3×N configuration)

Figure 15:
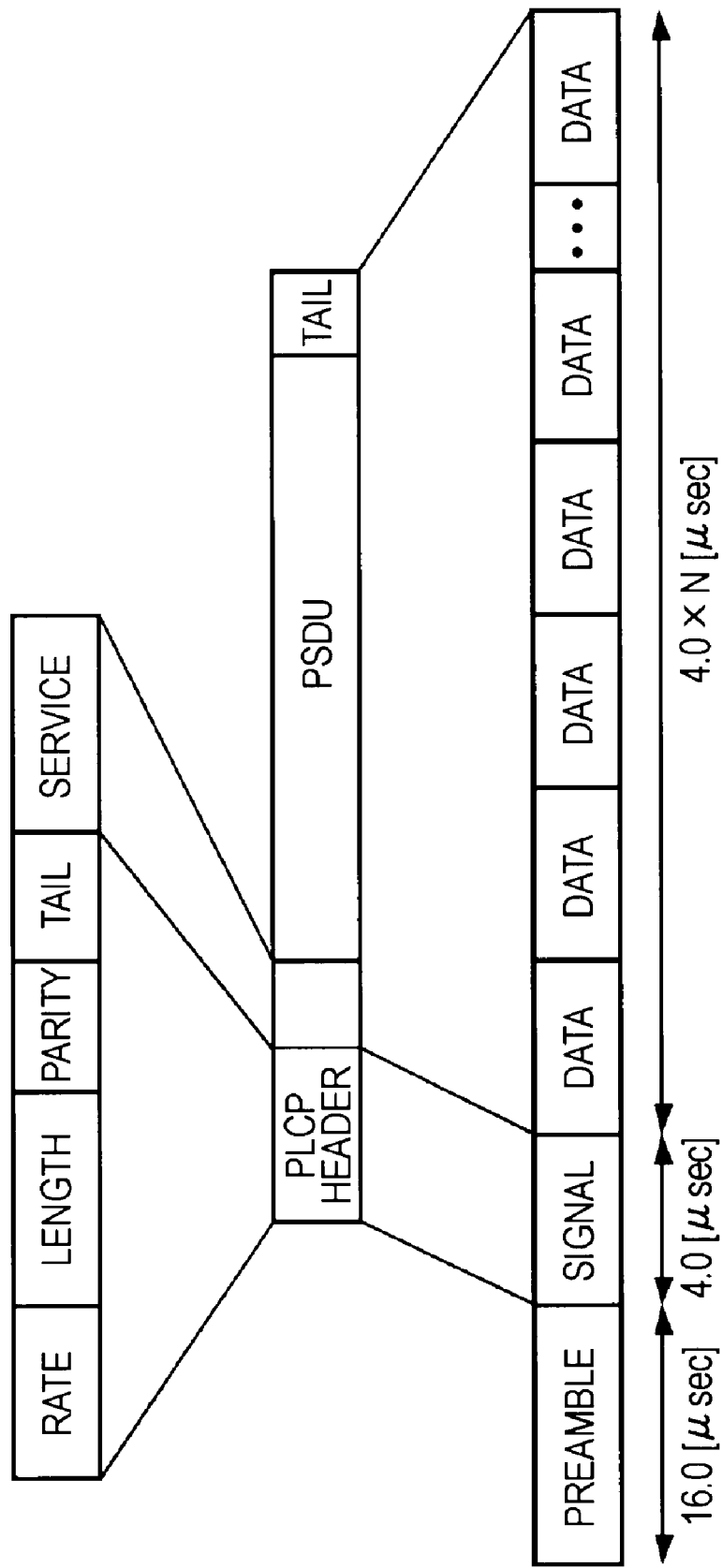
FIG. 15 illustrates a frame format of IEEE802.11a/g.

The packet in the legacy mode (hereinafter referred to as "legacy packet") has the completely same format as that of IEEE802.11a/g (see FIGS. 15 and 16). That is, the header of the legacy packet includes the L-STF (Legacy STF), the L-LTF (Legacy LTF) and L-SIG (Legacy Signal field) as the legacy preamble followed by payload (Data). The L-STF (Legacy STF) includes known training symbol STS for packet detection. The L-LTF (Legacy LTF) includes a repetition of known training symbols LTS for synchronization acquisition and channel equalization. The L-SIG (Legacy Signal field) describes control information, such as a transmission rate and a data length.

A header of a packet in an MM mode (hereinafter referred to as "MM packet") includes a legacy preamble of the completely same format as that of IEEE802.11a/g, and a preamble (hereinafter, referred to as "HT preamble") having a format peculiar to subsequent IEEE802.11n (hereinafter, referred to as "HT format") and a data section. A part of the legacy packet corresponding to the PHY payload in the MM packet is in the HT format. That is, the HT format recursively includes the HT preamble and the PHY payload.

The HT preamble includes HT-SIG, HT-STF and HT-LTF. The HT-SIG has control information necessary for interpreting to interpret the HT format of MCS, data length of payload, etc. applied by PHY payload (PSDU). The HT-STF consists of training symbols for improving automatic gain control (AGC) in the MIMO system. The HT-LTF consists of training symbols for performing channel estimation for each input signal space-modulated (mapped) at the receiver end.

In the MIMO communication which uses two or more transmission branches, it is necessary at the receiver end to acquire a channel matrix by estimating the channel for each transmitting and reception antennas in which the received signals are space separated. Thus, at the transmitter end, the HT-LTF is transmitted in a time-sharing mode from each transmission antenna. Therefore, one or more HT-LTF fields will be added according to the number of space streams.

The data field is processed by 64-point FFT in a 20MHz-bandwidth packet format and is processed by 128-point FFT in a 40 MHz-bandwidth packet format. Since the bandwidth typically is in terms of 20 MHz in the legacy fields, such as L-LTF (i.e., a 40 MHz-bandwidth packet format includes two 20 MHz signals arranged in a frequency axial directions), a substituting process in a 64-point FFT may be possible. Usually, a 128-point FFT is used for the 40 MHz-bandwidth.

The legacy preamble in the MM packet is in a common format as that of the preamble of the legacy packet (see FIG. 16) and is transmitted in a transmission method in which the legacy terminal may be decoded. The HT format portion after the HT preamble is transmitted by a transmission method to which the legacy terminal does not correspond.

Generally, in either of the legacy packet format or the MM packet format, rough reception timing (i.e., temporary reception timing) is first determined through autocorrelation of the reception L-STF portion. Then, more exact reception timing is extracted through cross correlation of the reception L-LTF portion. However, if a cross correlation circuit of the L-LTF is mounted for each reception branch, the circuit size becomes large, whereby the manufacturing cost of system increases or the power consumption of the receiver increases (as described above).

In the present embodiment, therefore, the rough reception timing (i.e., the temporary reception timing) is determined at the preamble of the packet head in the synchronizing circuit 124, and the multiple synchronization candidates are set up around the temporary reception timing. Then, the signal quality of each of the received signal synchronized with each of the multiple synchronization candidates is monitored and a synchronization candidate having the best quality in accordance with predetermined selection criteria is determined as the final reception timing. According to such a synchronizing method, exact reception timing may be detected without using an L-LTF crosscorrelation operation.

Figure 4:
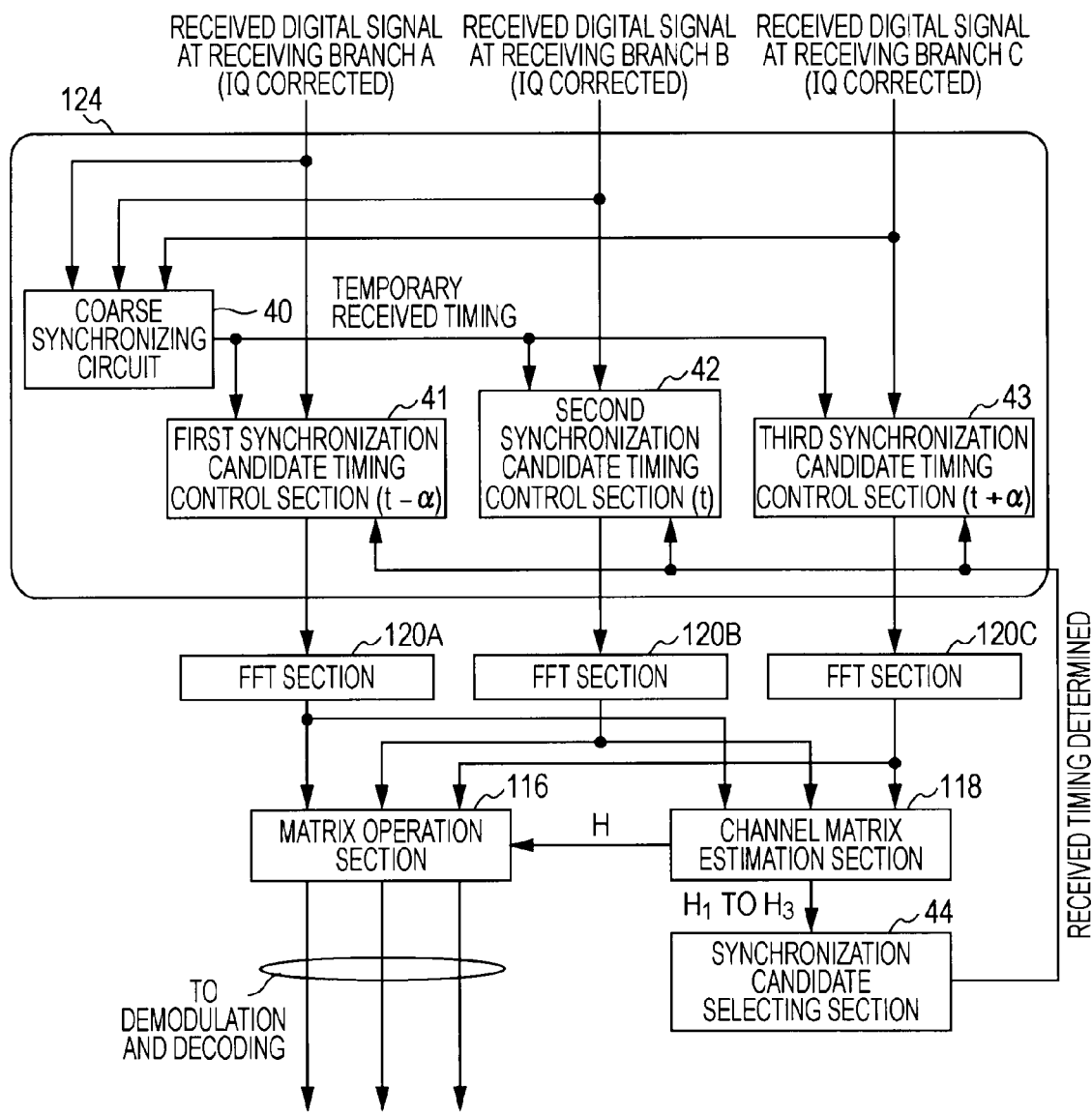
FIG. 4 illustrates a configuration of an inside of a synchronizing circuit and its peripheral circuit (first embodiment)

FIG. 4 shows configuration (first embodiment) of inside of the synchronizing circuit 124 and its peripheral circuit. In the illustrated example, three reception branches are provided for ease of description.

In the synchronizing circuit 124, a coarse synchronizing circuit 40 for determining the rough reception timing (temporary reception timing) using the reception L-STF portion is provided for each reception branch. Reception digital signals subject to IQ error correction in each of the reception branches is input into the coarse synchronizing circuit 40.

The synchronizing circuit 124 creates multiple synchronization candidates centering on the temporary reception timing obtained from the coarse synchronizing circuit 40 and then assigns the candidates to each of the reception branches. In particular, suppose that the time of the temporary reception timing determined by the L-STF is t, a first synchronization candidate timing control section 41 sends the L-LTF received at the first branch synchronized the synchronization candidate (t−alpha) to the FFT section 120A. A second synchronization candidate timing control section 42 sends the L-LTF received at a second branch synchronized the synchronization candidate t to a FFT section 120B. A third synchronization candidate timing control section 43 sends the L-LTF received at a third branch synchronized the synchronization candidate (t+alpha) to a FFT section 120C. In this manner, by assigning the received signal s of which synchronization timing is controlled with each of the multiple synchronization candidates to each of the reception branches, different synchronization candidates may be processed at the same time.

After a suitable synchronization candidate is selected by the synchronization candidate selecting section 44, which will be described later, each of the synchronization candidate timing control sections 41 to 43 output, according to the selection result, the received signal s (L-SIG or subsequent ones) of each of the reception branches to each of the FFT sections 120A to 120C at a reception timing of any predetermined time of (t−alpha), t and (t+alpha).

The FFT section 120A provides a FFT window based on the time (t−alpha) which is one of the synchronization candidates and performs a FFT operation for the L-LTF. The FFT section 120B provides a FFT window based on the time t which is another of the synchronization candidates and performs a FFT operation for the L-LTF. The FFT section 120C provides a FFT window based on the time (t+alpha) which is the further synchronization candidates and performs a FFT operation for the L-LTF. As already stated, since the bandwidth of the L-LTF typically is in terms of 20 MHz, the FFT sections 120A to 120C, may perform both of the 64-point and 128-point FFT operations.

The FFT operation results from each of the FFT sections 120A to 120C are input into subsequent channel matrix estimation section 118, and the first to third channel matrices H1 to H3 are estimated for each of the multiple synchronization candidates. The channel matrix H is a numerical matrix consisting of a transfer function corresponding to a pair of transmitting and reception antennas. For a process of selecting the synchronization candidate, however, the transfer function is estimated using the L-LTF which consists of known training signals.

Subsequently, the synchronization candidate selecting section 44 compares quality of the received signal s based on the first to third channel matrices H1 to H3 obtained from the FFT operation result of the L-LTF which synchronized at each of the reception branches with the synchronization candidates (t−alpha), t and (t+alpha) and selects a synchronization candidate having the best quality.

The synchronization candidate selecting section 44 may determine the matrix norm of the inverse matrix H-1 of the channel matrix H estimated for each reception branch by, for example, comparing the size of the norms and may determine a synchronization candidate which is sent to the reception branch having the smallest norm as the best reception timing. Here, the norm is described for each line (i.e., for each reception stream). However, since selection of the synchronization candidate uses only one branch to receive, the first to third channel matrices H1 to H3 may be considered as the individual reception branch.

In this manner, after the synchronization candidate selecting section 44 selects the best synchronization candidate, the synchronizing circuit 124, based on the information, establishes the reception timing unified at any one of the synchronization candidates for the signals following the L-SIG and processes the received signal s at the synchronization timing.

After a suitable synchronization candidate is selected by the synchronization candidate selecting section 44, which will be described later, each of the synchronization candidate timing control sections 41 to 43 output, according to the selection result, the received signal s (L-SIG or subsequent ones) of each of the reception branches to each of the FFT sections 120A to 120C at a reception timing of any predetermined time of (t−alpha), t and (t+alpha). That is, each of the synchronization candidate timing control sections 41 to 43 processes the received signal at the synchronization timing after the L-SIG.

Each coarse synchronizing circuit 40 determines the temporary reception timing through autocorrelation of the L-STF portion. Such an autocorrelation circuit may be provided by a relatively small circuit.

Figure 5:
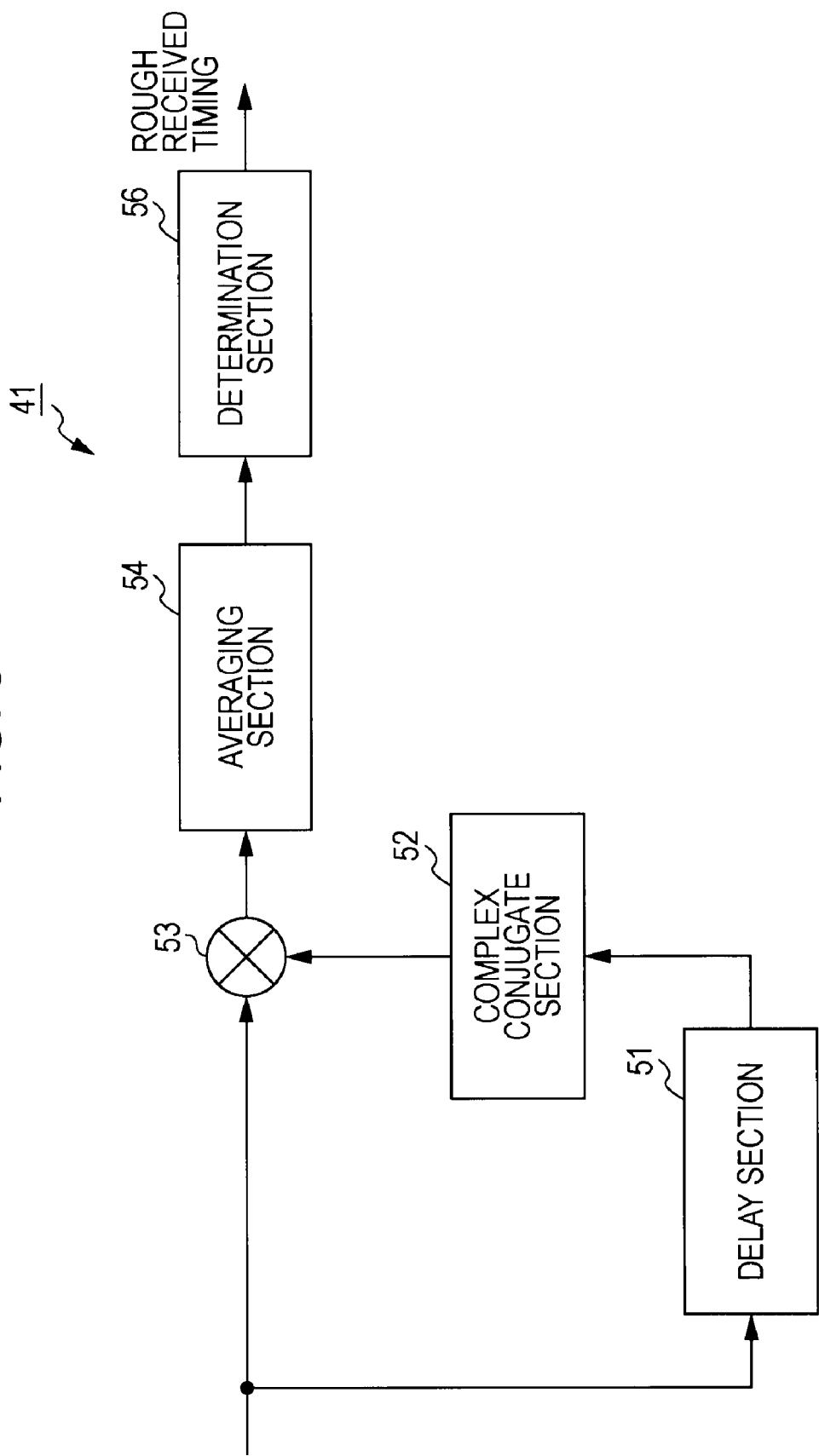
FIG. 5 illustrates an exemplary internal configuration of a coarse synchronizing circuit.
Figure 6:
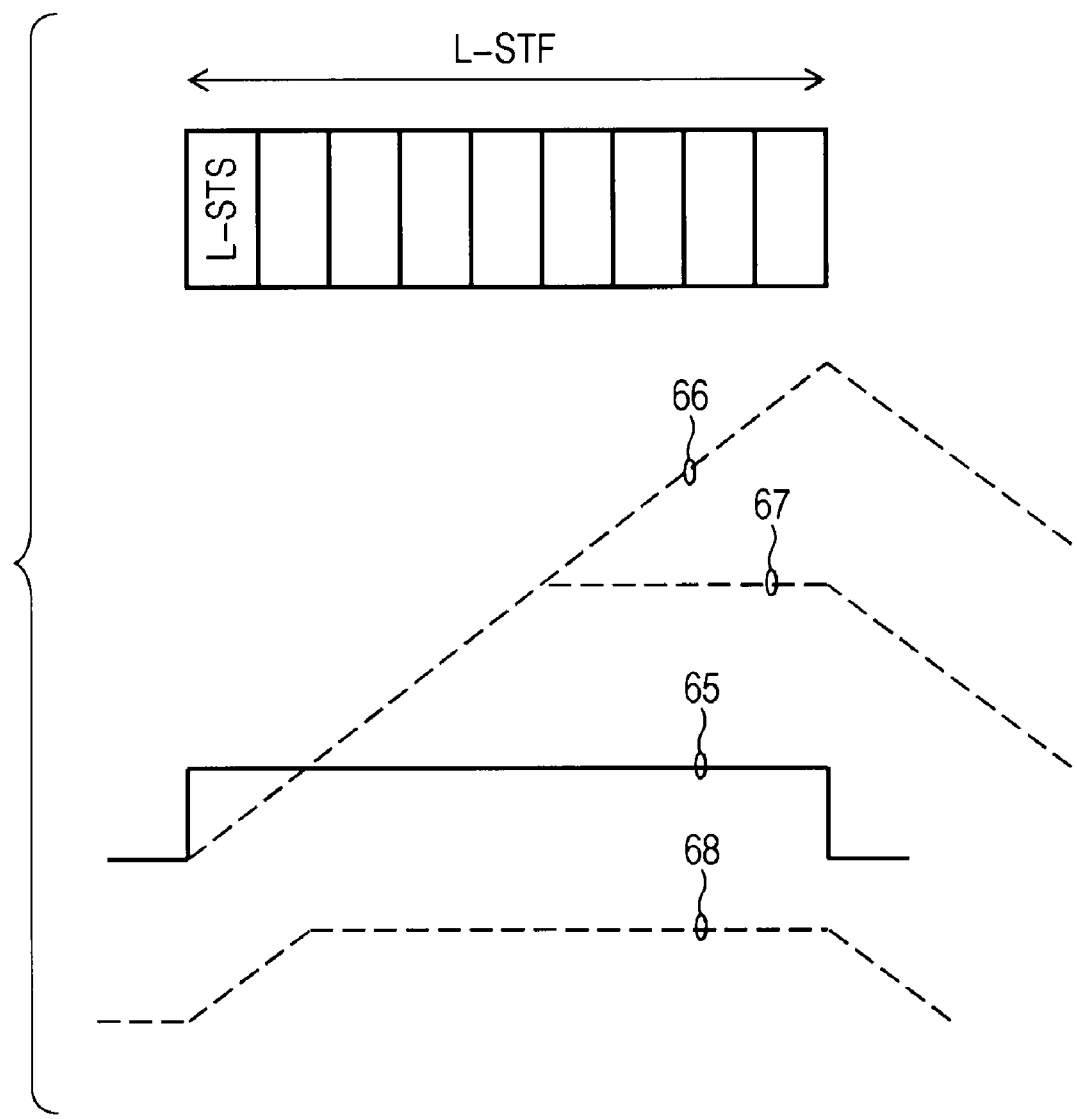
FIG. 6 is an output chart of each functional module illustrated in FIG. 5.

FIG. 5 illustrates an exemplary internal configuration of a coarse synchronizing circuit 40. FIG. 6 is an output chart of each functional module illustrated in FIG. 5.

A delay section 51 keeps 0.8-microsecond-interval received signal corresponding to a repeating cycle of the known training sequence STS and outputs the signal as a delay signal. A complex conjugate section 52 takes complex conjugate number of the delay signal. A multiplication section 53 performs complex conjugate multiplication of the received signal and the delay signal for the repeating cycle distance (0.8 microseconds) of the known training sequence STS.

Averaging section 54 calculates moving average of product which multiplication section 53 outputs by making the entire L-STF section into the moving average section, and calculates autocorrelation value. A determination section 56 determines rough reception timing when the autocorrelation value exceeds a predetermined threshold.

The complex conjugate multiplication result of the received signal and the delay signal output from the multiplication section 53 is a constant value represented by a rectangle as denoted by reference numeral 6 in FIG. 6 since 0.8 microseconds after the repetition of the known training sequence STS of the L-STF begins until 8.0 microseconds when the L-STF is completed. When the averaging section 54 calculates the moving average for 7.2 microseconds corresponding to this section, as denoted by reference numeral 66 in FIG. 6, the above-described rectangular shape will be integrated into a triangle-shape. A determination section 56 may thus compare the moving average in the length of the L-STF section and the threshold to determine the rough reception timing.

Figure 7:
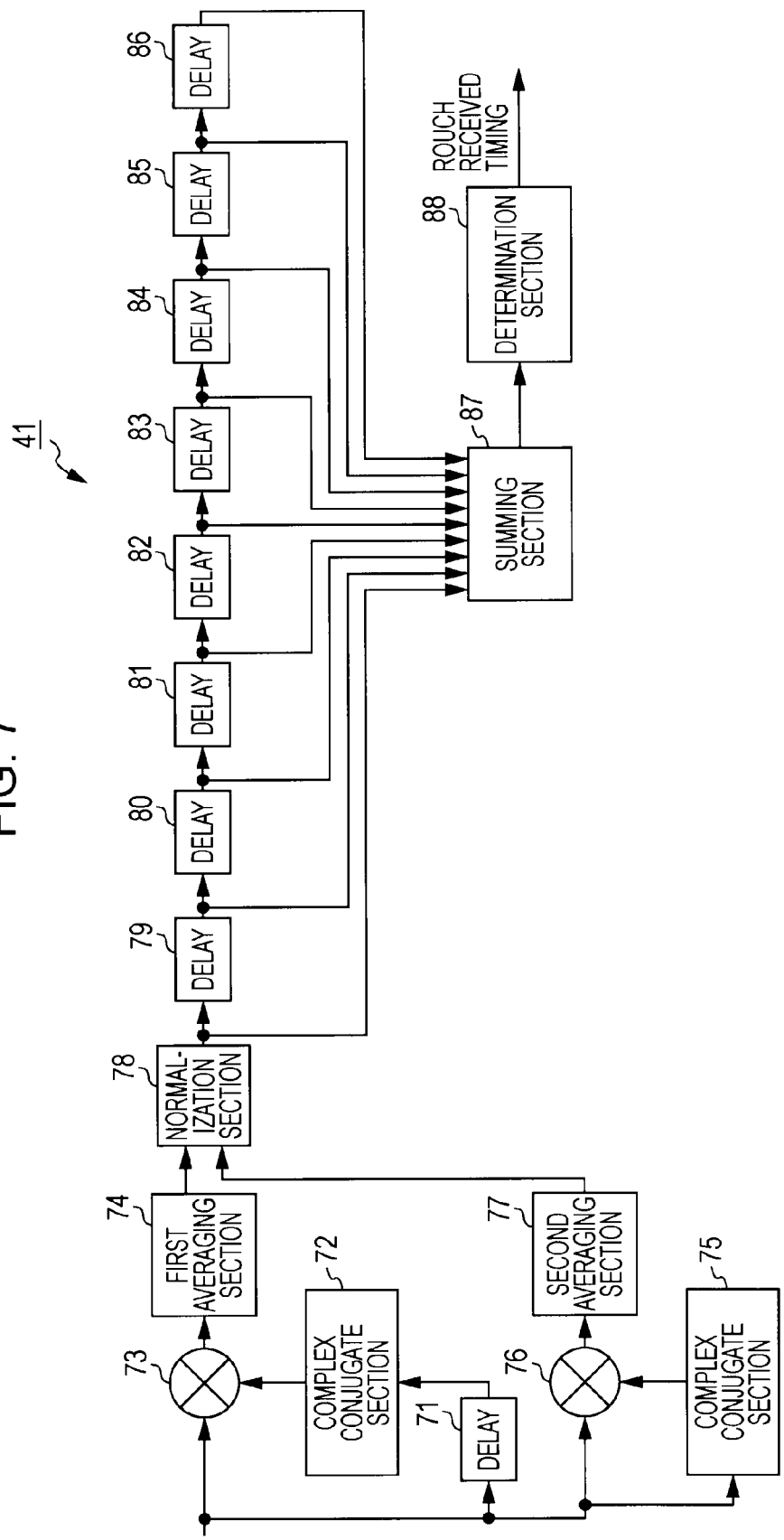
FIG. 7 illustrates another exemplary configuration of the coarse synchronizing circuit.

FIG. 7 illustrates another exemplary configuration of the coarse synchronizing circuit 40.

A delay section 71 keeps 0.8-microsecond-interval received signal s corresponding to the repeating cycle of the known training sequence STS and outputs the signals as delay signals. A complex conjugate section 72 takes a complex conjugate number of the delay signals output from the delay section 71. A multiplication section 73 performs complex conjugate multiplication of the received signal s and the delay signals corresponding to the repeating cycle interval (i.e., 0.8 microseconds) of the known training sequence STS. A first averaging section 74 calculates a moving average with one repeating cycle of the known training sequence STS as the moving average section. The moving average for one repeating cycle is denoted by reference numeral 68 in FIG. 6, which has a trapezoidal shape lower than that of the moving average for a section of 4 microseconds corresponding to 5 repeating cycles denoted by reference numeral 67 in FIG. 6.

A complex conjugate section 75 takes the complex conjugate number of the received signal. A multiplication section 76 performs the complex conjugate multiplication of the received signal s to obtain reception electric power. A second averaging section 77 takes a moving average over the section for two repeating cycles of the known training sequence STS and obtains average reception electric power (i.e., the moving average of squared reception samples).

A normalization section 78 normalizes one by one the autocorrelation output from the first averaging section 74 with the average reception electric power output from the second averaging section 77. The receiver stands for the reception with the maximum AGC gain. Influence of variation in the AGC gain at the packet head can be eliminated by the normalizing process.

Figure 8:
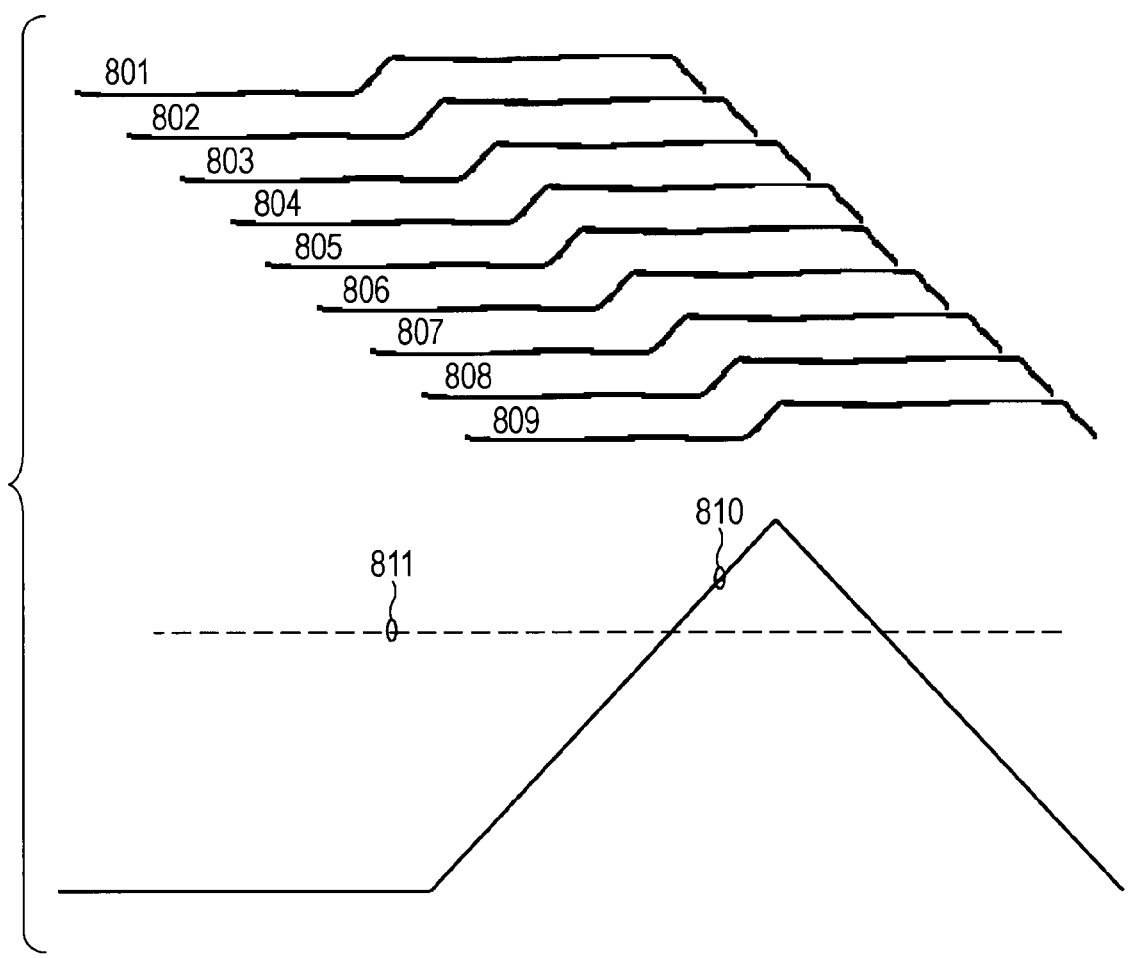
FIG. 8 illustrates that a moving average with one cycle period as a moving average section normalized by the normalization section is given delay by the repeating cycle (i.e., 0.8 microseconds) by the eight delay sections.

Series-connected subsequent eight delay sections 79 to 86 each consists of a delay element having with 0.8 microsecond time delay corresponding to the repeating cycle of the known training sequence STS. The number of the delay sections 79 to 86 corresponds to the number of times of the repetition of known training sequences. FIG. 8 illustrates that a moving average with one cycle period as a moving average section normalized by the normalization section 78 is given delay by the repeating cycle (i.e., 0.8 microseconds) by the eight delay sections 79 to 86. Reference numeral 801 in FIG. 8 denotes the output of the normalization section 78 and reference numerals 802 to 809 denote outputs of the delay sections 79 to 86, respectively.

A summing section 87 takes an output of the normalization section 78 and the total of the outputs 801 to 809 of all the delay sections 79 to 86. The total value corresponds to obtaining normalization autocorrelation with the entire L-STF section as the moving average section, and has a triangular shape as denoted by the reference numeral 810 in FIG. 8. Therefore, a determination section 88 may compare the output and the threshold (reference numeral 811 in FIG. 8) of the summing section 87 and determine rough reception timing (temporary reception timing).

In the embodiment shown in FIG. 4, a synchronization candidate is selected based on the quality of the channel matrix H from among the multiple synchronization candidates created based on the rough reception timing (temporary reception timing) determined trough autocorrelation of the L-STF portion. Another criterion for selecting a synchronization candidate may be a method of comparing operation outputs of the L-LTF synchronized with each of the multiple synchronization candidates.

Figure 9:
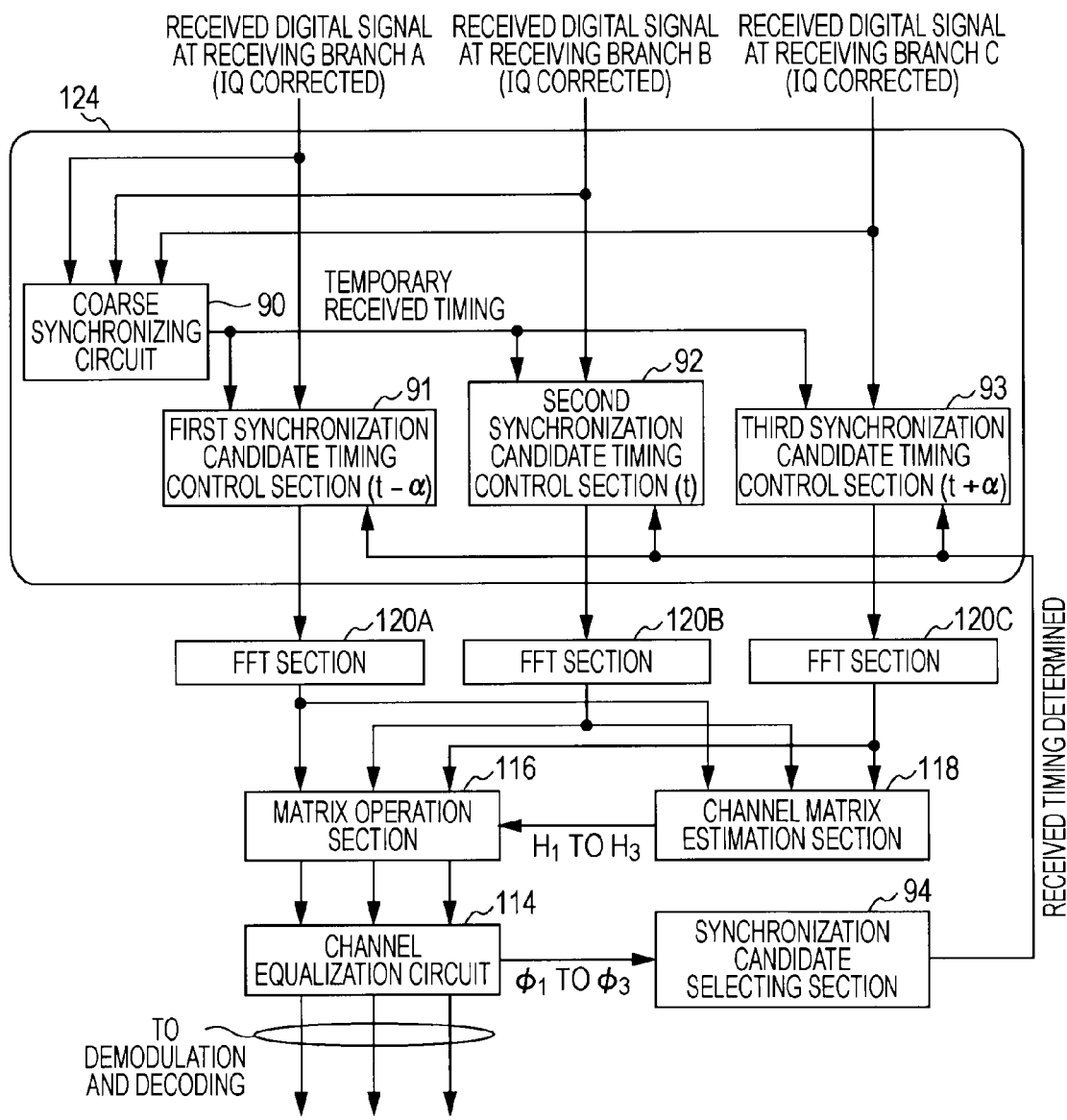
FIG. 9 illustrates a configuration of an inside of the synchronizing circuit and its peripheral circuit (second embodiment)

FIG. 9 illustrates a configuration of an inside of the synchronizing circuit 124 and its peripheral circuit (second embodiment) in which the synchronization candidate is selected based on the amount of phase rotation of the L-LTF portion after the FFT operation is performed with multiple synchronization candidates from the original signal. In the illustrated example, three reception branches are provided for ease of description.

A coarse synchronizing circuit 90 for determining the rough reception timing (temporary reception timing) using the reception L-STF portion is provided in the synchronizing circuit 124. Received digital signals subject to IQ error correction in each of the reception branches are input into the coarse synchronizing circuit 90. The coarse synchronizing circuit 90 is configured as shown, for example, in FIG. 5 or FIG. 7 (as described above).

The synchronizing circuit 124 creates multiple synchronization candidates centering on the temporary reception timing obtained from the coarse synchronizing circuit 90 and then assigns the candidates to each of the reception branches. In particular, suppose that the time of the temporary reception timing determined by the L-STF is t, a first synchronization candidate timing control section 91 sends the L-LTF received at the first branch synchronized the synchronization candidate (t−alpha) to the FFT section 120A. A second synchronization candidate timing control section 92 sends the L-LTF received at a second branch synchronized the synchronization candidate t to a FFT section 120B. A third synchronization candidate timing control section 93 sends the L-LTF received at a third branch synchronized the synchronization candidate (t+alpha) to a FFT section 120C. In this manner, by assigning the received signal s of which synchronization timing is controlled with each of the multiple synchronization candidates to each of the reception branches, different synchronization candidates may be processed at the same time.

After a suitable synchronization candidate is selected by the synchronization candidate selecting section 94, each of the synchronization candidate timing control sections 91 to 93 output, according to the selection result, the received signal s (L-SIG or subsequent ones) of each of the reception branches to each of the FFT sections 120A to 120C at a reception timing of any predetermined time of (t−alpha), t and (t+alpha).

The FFT section 120A provides a FFT window based on the time (t−alpha) which is one of the synchronization candidates and performs a FFT operation for the L-LTF. The FFT section 120B provides a FFT window based on the time t which is another of the synchronization candidates and performs a FFT operation for the L-LTF. The FFT section 120C provides a FFT window based on the time (t+alpha) which is the further synchronization candidates and performs a FFT operation for the L-LTF (as described above).

The FFT operation results from each of the FFT sections 120A to 120C are input into subsequent channel matrix estimation section 118, and the first to third channel matrices H1 to H3 are estimated for each of the multiple synchronization candidates. For a process of selecting the synchronization candidate, the channel matrix estimation section 118 is estimated using the L-LTF which consists of known training signals. The matrix operation section 116 performs matrix operation for the L-LTF portion after the FFT operation for each of the reception branches (i.e., the L-LTF which has become a frequency domain), using channel matrices H1 to H3 estimated for each of the multiple synchronization candidates.

In the subsequent channel equalization circuit 114, residual frequency offset correction and channel tracking are performed to the received signal at each of the reception branches. In this manner, the amount of phase rotation of the received signal with respect to the known fixed pattern may be determined. When selecting the synchronization candidate, the synchronization candidate selecting section 94 selects the synchronization candidate corresponding to the reception branch having the smallest amount of phase rotation with respect to the original signal as the synchronization candidate of best quality.

Generally, for the information signal after SIG, an amount phi of phase rotation is computed based on the pilot signal (as described above) (Four pilot subcarriers are inserted in 20 MHz band mode and six pilot subcarriers are inserted in 40

MHz band mode). In the present embodiment, however, synchronization candidate is selected based on comparison of the amount of phase rotation taking advantage that the entire L-LTF consists of the known signal. That is, the channel equalization circuit 114 computes the amount of phase rotation for some of the signals in all the subcarriers of the L-LTF. The synchronization candidate selecting section 94 selects the synchronization candidate having the smallest amount of phase rotation among phi1 to phi3 calculated in the channel equalization circuit 114 for each of the multiple synchronization candidates. Although the amount of phase rotation may be calculated for all the subcarriers, the calculation amount increases and is thus impractical.

In this manner, after the synchronization candidate selecting section 94 selects the best synchronization candidate, the synchronizing circuit 124, based on the information, establishes the reception timing unified at any one of the synchronization candidates for the signals following the L-SIG and processes the received signal s at the synchronization timing.

In both the embodiments shown in FIG. 4 and FIG. 9, synchronization candidate is selected based on the information (i.e., information before demodulation and decoding) obtained from the FFT operation output of the L-LTF in each of the reception branches to which multiple synchronization candidates are assigned. Another embodiment may include a method in which processes before the decoder 104 are first completed for the FFT operation output of each of the multiple synchronization candidates and the synchronization candidates are evaluated and selected based on the decoded result.

Figure 10:
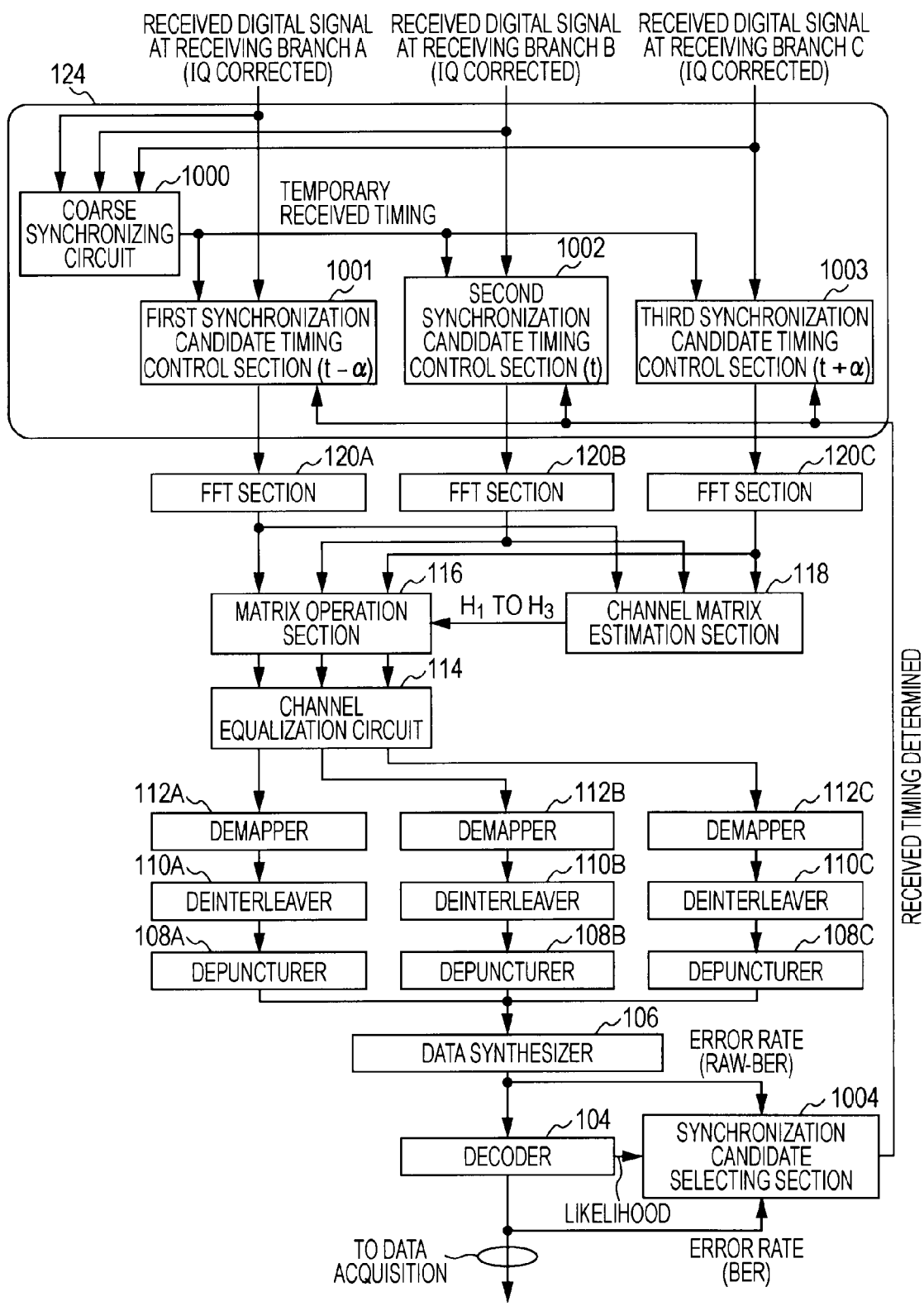
FIG. 10 illustrates a configuration of an inside of the synchronizing circuit and its peripheral circuit (third embodiment)

FIG. 10 illustrates a configuration of an inside of the synchronizing circuit 124 and its peripheral circuit (third embodiment) in which processes before the decoder 104 has been completed for the FFT operation output of each of the multiple synchronization candidates and the synchronization candidates are evaluated and selected based on the decoded result. In the illustrated example, three reception branches are provided for ease of description.

In the synchronizing circuit 124, a coarse synchronizing circuit 100 for determining the rough reception timing (temporary reception timing) using the reception L-STF portion is provided for each reception branch. Received digital signals subject to IQ error correction in each of the reception branches are input into the coarse synchronizing circuit 1000. The coarse synchronizing circuit 1000 is configured a shown, for example, in FIG. 5 or FIG. 7 (as described above).

The synchronizing circuit 124 creates multiple synchronization candidates centering on the temporary reception timing obtained from the coarse synchronizing circuit 1000 and then assigns the candidates to each of the reception branches. In particular, suppose that the time of the temporary reception timing determined by the L-STF is t, a first synchronization candidate timing control section 1001 sends the L-LTF received at the first branch synchronized the synchronization candidate (t−alpha) to the FFT section 120A. A second synchronization candidate timing control section 1002 sends the L-LTF received at a second branch synchronized the synchronization candidate t to a FFT section 120B. A third synchronization candidate timing control section 1003 sends the L-LTF received at a third branch synchronized the synchronization candidate (t+alpha) to a FFT section 120C. In this manner, by assigning the received signals of which synchronization timing is controlled with each of the multiple synchronization candidates to each of the reception branches, different synchronization candidates may be processed at the same time.

After a suitable synchronization candidate is selected by the synchronization candidate selecting section 1004, which will be described later, each of the synchronization candidate timing control sections 1001 to 1003 output, according to the selection result, the received signal s (L-SIG or subsequent ones) of each of the reception branches to each of the FFT sections 120A to 120C at a reception timing of any predetermined time of (t−alpha), t and (t+alpha).

The FFT section 120A provides a FFT window based on the time (t−alpha) which is one of the synchronization candidates and performs a FFT operation for the L-LTF. The FFT section 120B provides a FFT window based on the time t which is another of the synchronization candidates and performs a FFT operation for the L-LTF. The FFT section 120C provides a FFT window based on the time (t+alpha) which is the further synchronization candidates and performs a FFT operation for the L-LTF (as described above).

The FFT operation results from each of the FFT sections 120A to 120C are input into subsequent channel matrix estimation section 118, and the first to third channel matrices H1 to H3 are estimated for each of the multiple synchronization candidates. For a process of selecting the synchronization candidate, the channel matrix estimation section 118 is estimated using the L-LTF which consists of known training signals. The matrix operation section 116 performs matrix operation for the L-LTF portion after the FFT operation for each of the reception branches (i.e., the L-LTF which has become a frequency domain), using channel matrices H1 to H3 estimated for each of the multiple synchronization candidates.

In the subsequent channel equalization circuit 114, residual frequency offset correction and channel tracking are performed to the received signal at each of the reception branches. Demappers 112A to 112C demap the received signal in the IQ signal space. Deinterleavers 110A to 110C deinterleave. Depuncturers 108A to 108C depuncture at a predetermined data rate. A data synthesizer 106 synthesizes multiple reception streams to a single stream. Subsequently, the decoder 104 performs a maximum likelihood sequence estimation process in a soft decision decoding system, such as Viterbi decoding, to estimate a reception bit series. However, for the known signal (L-STF or L-LTF) used for selecting the synchronization candidate, the data synthesizer 106 and the decoder 104 process each of the multiple synchronization candidates.

In the maximum likelihood decoding system, such as Viterbi decoding, a good error rate is obtained compared with identification for each bit by calculating state shift likelihood (metric) recursively (well-known). The synchronization candidate selecting section 1004 selects the synchronization candidate corresponding to the reception branch with the highest likelihood that is necessary for the decoder 104 as the synchronization candidate of best quality.

In this manner, after the synchronization candidate selecting section 1004 selects the best synchronization candidate, the synchronizing circuit 124, based on the information, establishes the reception timing unified at any one of the synchronization candidates for the signals following the L-SIG and processes the received signal s at the synchronization timing.

Instead of the synchronization candidate selecting section 1004 which selects the synchronization candidate based on the likelihood information obtained from the decoder 104, the synchronization candidate corresponding to the reception branch with the lowest error rate (corresponding to RAWBER (Bit Error Rate)) for the known signal (L-STF or L-LTF) input into the decoder 104 may be selected as having the best quality. Alternatively, the synchronization candidate corresponding to the reception branch with the lowest error rate (corresponding to BER (Bit Error Rate)) for the known signal (L-STF or L-LTF) input into the decoder 104 may be selected as having the best quality.

Figure 11:
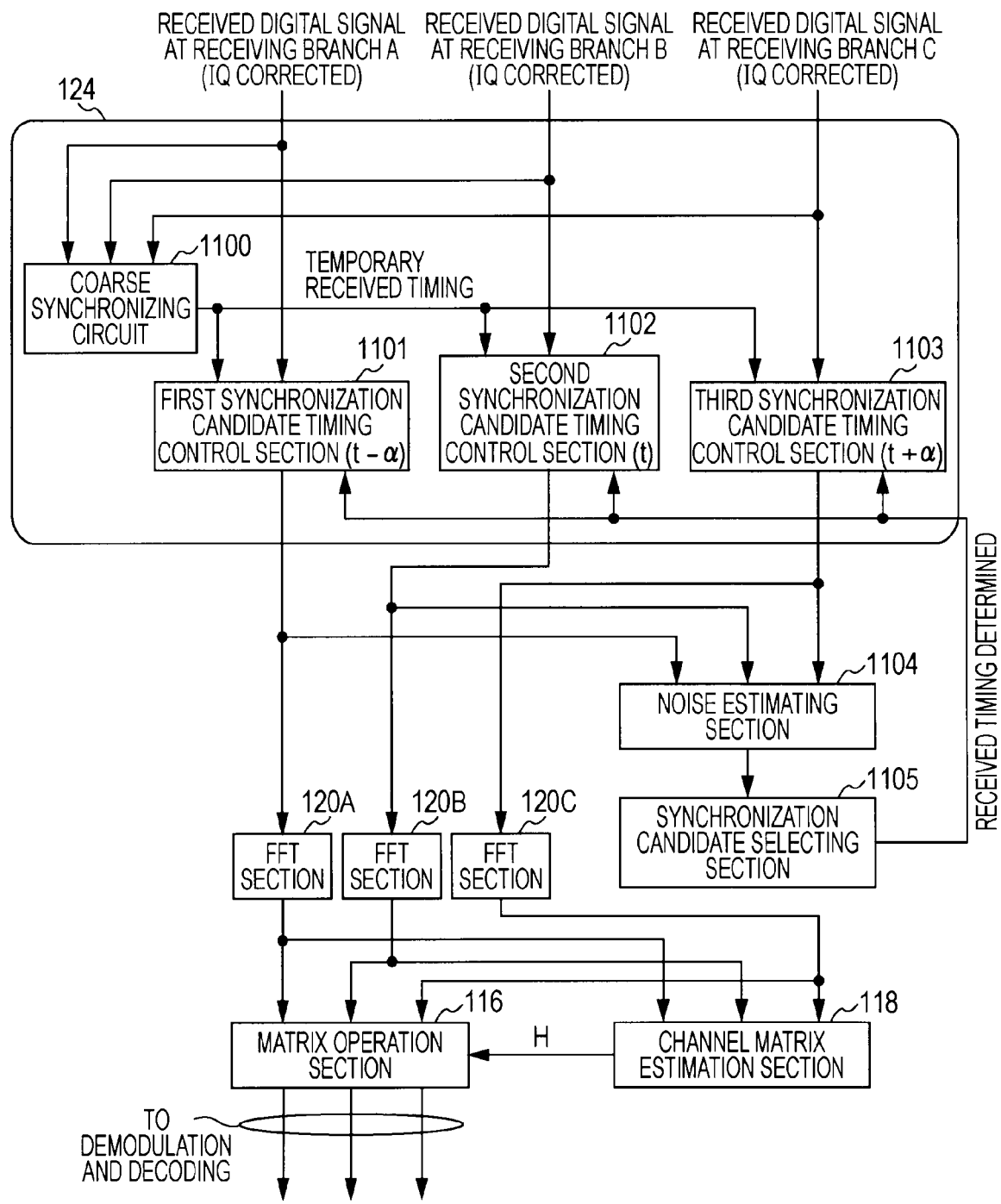
FIG. 11 illustrates a configuration of an inside of the synchronizing circuit and its peripheral circuit (fourth embodiment)

FIG. 11 illustrates a configuration of an inside of the synchronizing circuit 124 and its peripheral circuit (fourth embodiment) for selecting optimal reception timing from multiple synchronization candidates. In the illustrated example, three reception branches are provided for ease of description. In the illustrated embodiment, the known training signal LTS is repeated 2.5 times in the L-LTF. The amount of the noise is estimated through comparison of the first half and the second half of the L-LTF. The synchronization candidate corresponding to the reception branch with the lowest noise is selected as having the best quality.

In the synchronizing circuit 124, a coarse synchronizing circuit 100 for determining the rough reception timing (temporary reception timing) using the reception L-STF portion is provided for each reception branch. Reception digital signals subject to IQ error correction in each of the reception branches are input into the coarse synchronizing circuit 100.

The synchronizing circuit 124 creates multiple synchronization candidates centering on the temporary reception timing obtained from the coarse synchronizing circuit 1100 and then assigns the candidates to each of the reception branches. In particular, suppose that the time of the temporary reception timing determined by the L-STF is t, a first synchronization candidate timing control section 1101 sends the L-LTF reception at the first branch synchronized the synchronization candidate (t−alpha) to a noise estimating section 1104. A second synchronization candidate timing control section 1102 sends the L-LTF received at a second branch synchronized the synchronization candidate t to a noise estimating section 1104. A third synchronization candidate timing control section 1103 sends the L-LTF received at a third branch synchronized the synchronization candidate (t+alpha) to a noise estimating section 1104.

The noise estimating section 1104 compares the first half and the second half of the L-LTF to estimate the amount of the noise. The synchronization candidate selecting section 1105 selects the synchronization candidate corresponding to the reception branch with the lowest noise as having the best quality.

In this manner, after the synchronization candidate selecting section 1105 selects the best synchronization candidate, the synchronizing circuit 124, based on the information, establishes the reception timing unified at any one of the synchronization candidates for the signals following the L-SIG and processes the received signal s at the synchronization timing.

After a suitable synchronization candidate is selected by the synchronization candidate selecting section 1105, each of the synchronization candidate timing control sections 1101 to 1103 output, according to the selection result, the received signal s (L-SIG or subsequent ones) of each of the reception branches to each of the FFT sections 120A to 120C at a reception timing of any predetermined time of (t−alpha), t and (t+alpha). Accordingly, the received signals are processed at this synchronization timing after the L-SIG.

Figure 12:
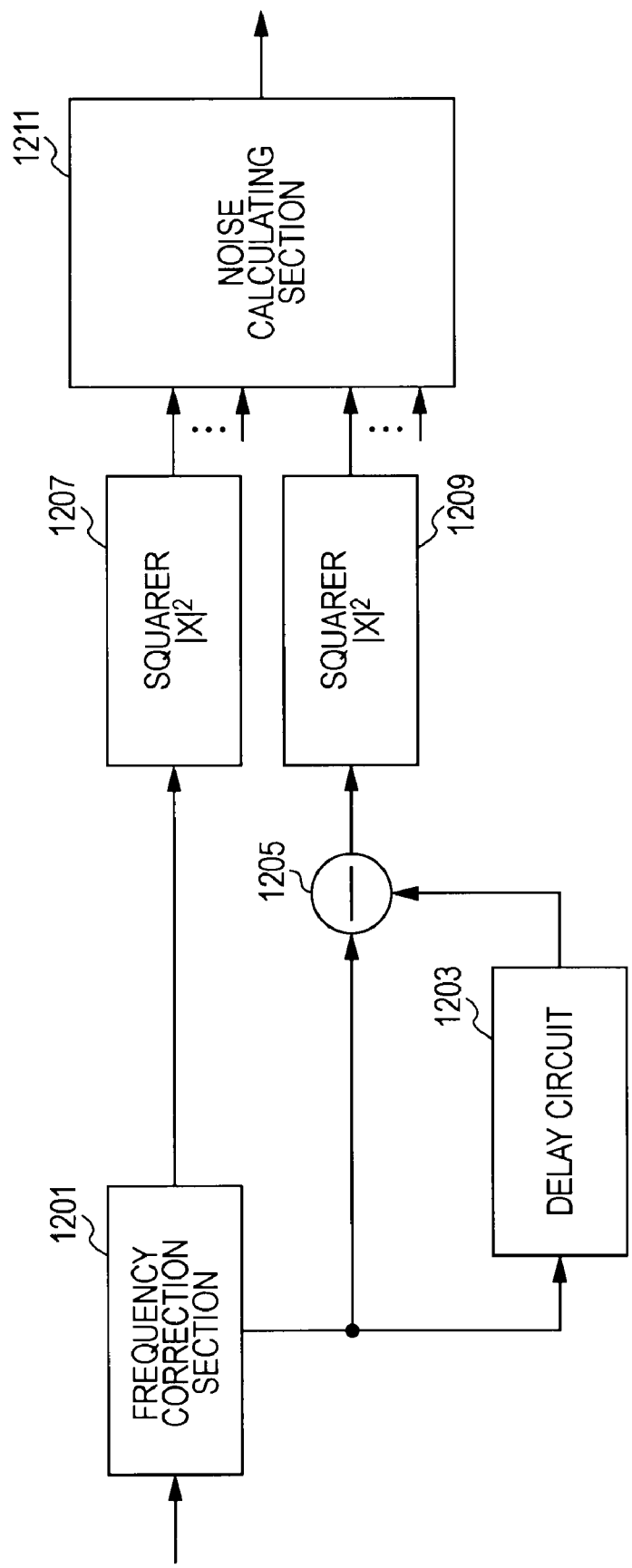
FIG. 12 illustrates an exemplary configuration of a noise estimating section.

An exemplary configuration of the noise estimating section 1104 is shown in FIG. 12.

The frequency correction section 1201 corrects the frequency offset of the received signal s. A delay circuit 1203 generates delay signals for the LTS repeating cycle. A differential device 1205 takes difference between repeating cycles and extracts a noise component. A squarer 1209 calculates a square value of the difference to obtain noise electric power. Another squarer 1207 calculates a square value of the signal to obtain signal electric power. The noise electric power is input to calculate an estimated value of the noise based on a ratio of these square values.

In each embodiment shown in FIG. 4, FIG. 9, FIG. 10 and FIG. 11, one synchronization candidate is assigned for each reception branch so that optimal reception timing may be selected among the synchronization candidates of the number of the reception branches in the entire receiver. However, multiple synchronization candidates arranged in the frequency axial direction may be assigned to one of the reception branches. That is, multiple synchronization candidates may be processed by a single reception branch (fifth embodiment). In this method, since the receiver selects more suitable reception timing from among the synchronization candidates greater in number than that of the reception branches, accuracy of timing detection is improved.

Figure 13:
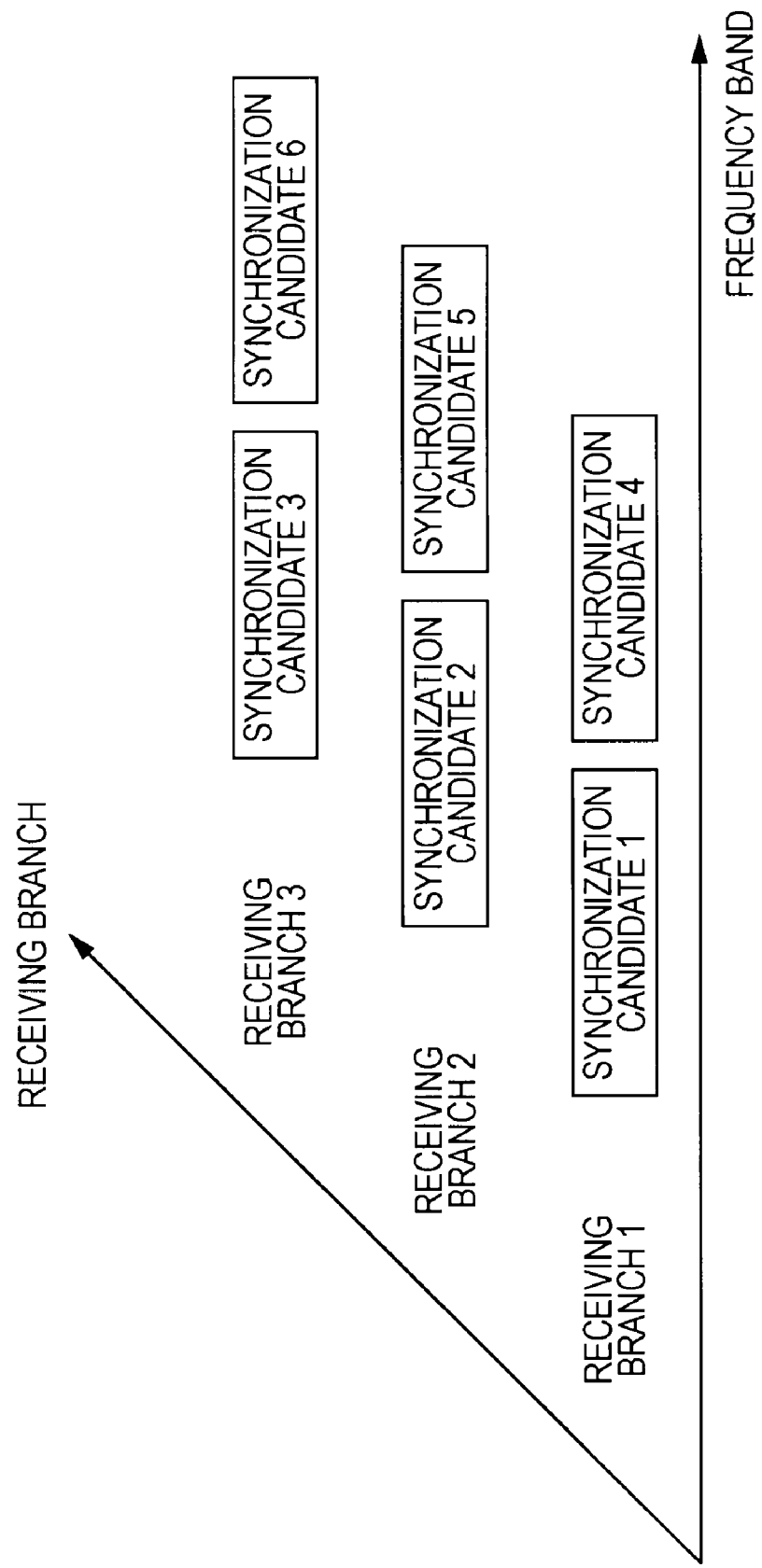
FIG. 13 illustrates that multiple synchronization candidates assigned to each reception branch are arranged in a frequency direction.

FIG. 13 illustrates that multiple synchronization candidates (FFT-operated L-LTF) assigned to each reception branch are arranged in a frequency direction. In the illustrated example, every two L-LTFs are arranged in the frequency axis. As described above, the bandwidth of the L-LTF is 20 MHz, which is the upper or lower half (upper bandwidth or lower bandwidth) of the full bandwidth (40 MHz) (see FIG. 3). Accordingly, a bandwidth of one of the two reception L-LTFs synchronized with different synchronization candidates may be shifted to the other unused 20 MHz bandwidth (lower bandwidth or upper bandwidth) so that both the L-LTFs may be placed within the bandwidth of the FFT section 120. FIG. 13 illustrates that the L-LTFs reception by the synchronization candidates 1 and 4 are disposed in the bandwidth of the FFT section 120A and assigned to the first reception branch, the L-LTFs received by the synchronization candidates 2 and 5 are disposed in the bandwidth of the FFT section 120B and assigned to the second reception branch, and the L-LTFs received by the synchronization candidates 3 and 6 are disposed in the bandwidth of the FFT section 120C and are assigned to the third reception branch.

Figure 14:
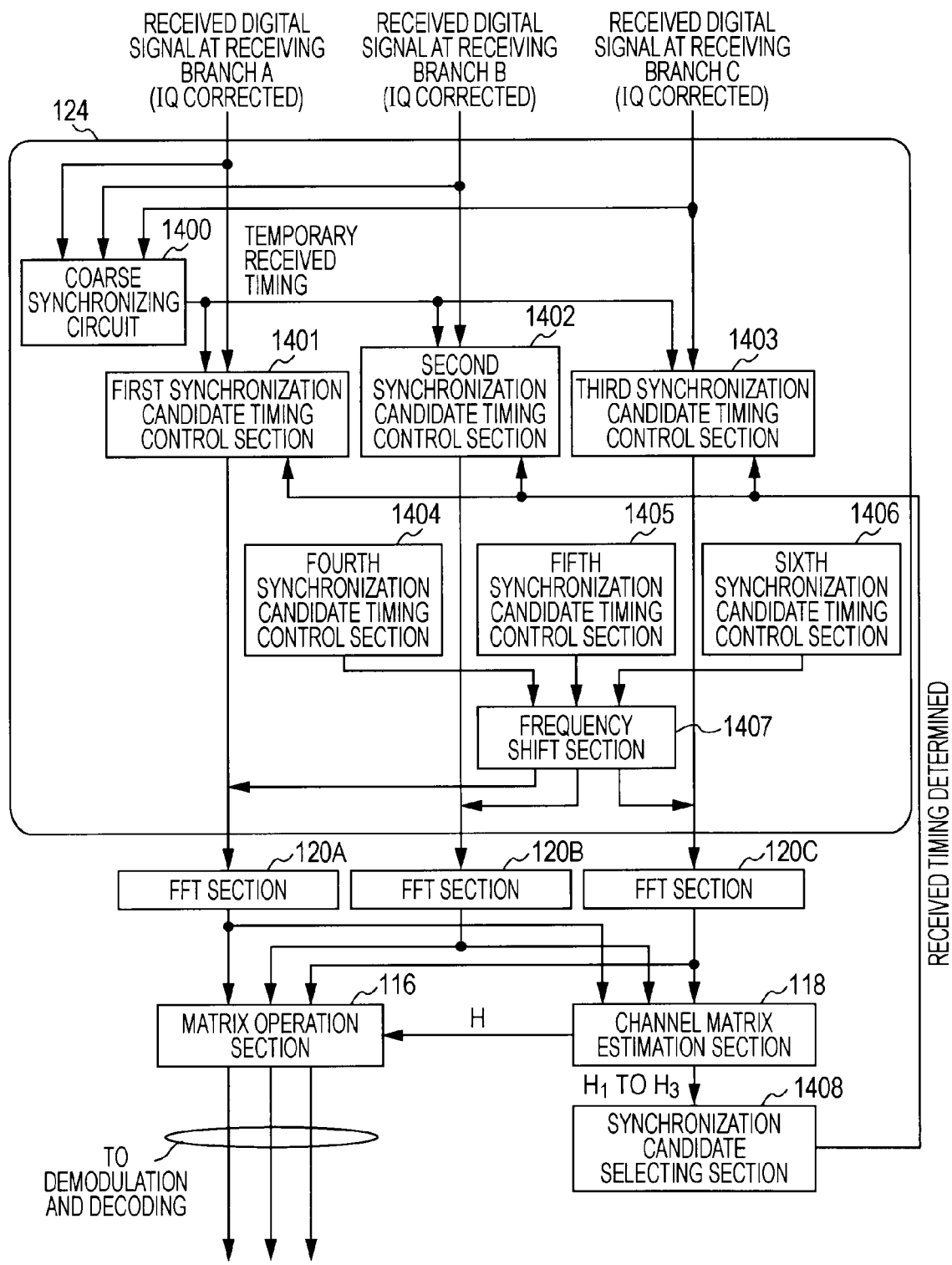
FIG. 14 illustrates a configuration of an inside of the synchronizing circuit and its peripheral circuit (fifth embodiment)

FIG. 14 illustrates a configuration of an inside of the synchronizing circuit 124 and its peripheral circuit according to the fifth embodiment.

In the synchronizing circuit 124, a coarse synchronizing circuit 1400 for determining the rough reception timing (temporary reception timing) using the received L-STF portion is provided for each reception branch. Received digital signals subject to IQ error correction in each of the reception branches are input into the coarse synchronizing circuit 40.

Six synchronization candidates 1 to 6, twice in number of the reception branches, focusing on the temporary reception timing obtained from the coarse synchronizing circuit 1400 are created. Every two synchronization candidates, namely, synchronization candidates 1 and 4, synchronization candidates 2 and 5, and synchronization candidates 3 and 6, are arranged in the frequency axial direction and assigned to each of the reception branches.

The first synchronization candidate timing control section 1401 and the fourth synchronization candidate timing control section 1404 receive the L-LTFs at the first branch synchronized by the synchronization candidates 1 and 4. The received signal of the fourth synchronization candidate timing control section 1404 is shifted to one of the 20 MHz band in the subsequent frequency shift section 1407. Each received signal is disposed in the 40 MHz band and sent to the FFT section 120A. The second synchronization candidate timing control section 1402 and the fifth synchronization candidate timing control section 1405 receive the L-LTFs at the second branch synchronized by the synchronization candidates 2 and 5. The received signal of the fifth synchronization candidate timing control section 1405 is shifted to one of the 20 MHz band in the subsequent frequency shift section 1407. Each received signal is disposed in the 40 MHz band and sent to the FFT section 120B. The third synchronization candidate timing control section 1403 and the sixth synchronization candidate timing control section 1406 receive the L-LTFs at the third branch synchronized by the synchronization candidates 3 and 6. The received signal of the sixth synchronization candidate timing control section 1406 is shifted to one of the 20 MHz band in the subsequent frequency shift section 1407. Each received signal is disposed in the 40 MHz band and sent to the FFT section 120C. In this manner, multiple synchronization candidates arranged in the frequency axial direction may be assigned to one reception branch and the synchronization candidates greater in number than that of the reception branches may be processed at the same time.

Each of the FFT sections 120A to 120C provides a FFT window based on each corresponding synchronization candidate and performs a FFT operation for the L-LTF.

The FFT operation results from each of the FFT sections 120A to 120C are input into subsequent channel matrix estimation section 118, and the channel matrices are estimated for each of the multiple synchronization candidates. Subsequently, the synchronization candidate selecting section 1408 compares quality of the received signal s based on the channel matrices obtained from the FFT operation result of the L-LTF which synchronized at each of the reception branches with the synchronization candidates and selects a synchronization candidate having the best quality. The synchronization candidate selecting section 44 may determine the matrix norm of the inverse matrix H-1 of the channel matrix H estimated for each reception branch by, for example, comparing the size of the norms and may determine a synchronization candidate which is sent to the reception branch having the smallest norm as the best reception timing.

In this manner, after the synchronization candidate selecting section 1408 selects the best synchronization candidate, the synchronizing circuit 124, based on the information, establishes the reception timing unified at any one of the synchronization candidates for the signals following the L-SIG and processes the received signal s at the synchronization timing.

After a suitable synchronization candidate is selected by the synchronization candidate selecting section 1408, each of the synchronization candidate timing control sections 1401 to 1403 output, according to the selection result, the received signal s (L-SIG or subsequent ones) of each of the reception branches to each of the FFT sections 120A to 120C at a reception timing of any predetermined time of (t−alpha), t and (t+alpha). Accordingly, the received signals are processed at this synchronization timing after the L-SIG.

Multiple synchronization candidates arranged in the frequency axial direction are assigned to one reception branch in the fifth embodiment shown in FIG. 14. As a modified embodiment, accuracy in timing detection may also be improved by selecting more suitable reception timing from a number of synchronization candidates greater in number than that of the reception branches by assigning multiple synchronization candidates arranged in the temporal axis direction to one reception branch.

Figure 16:
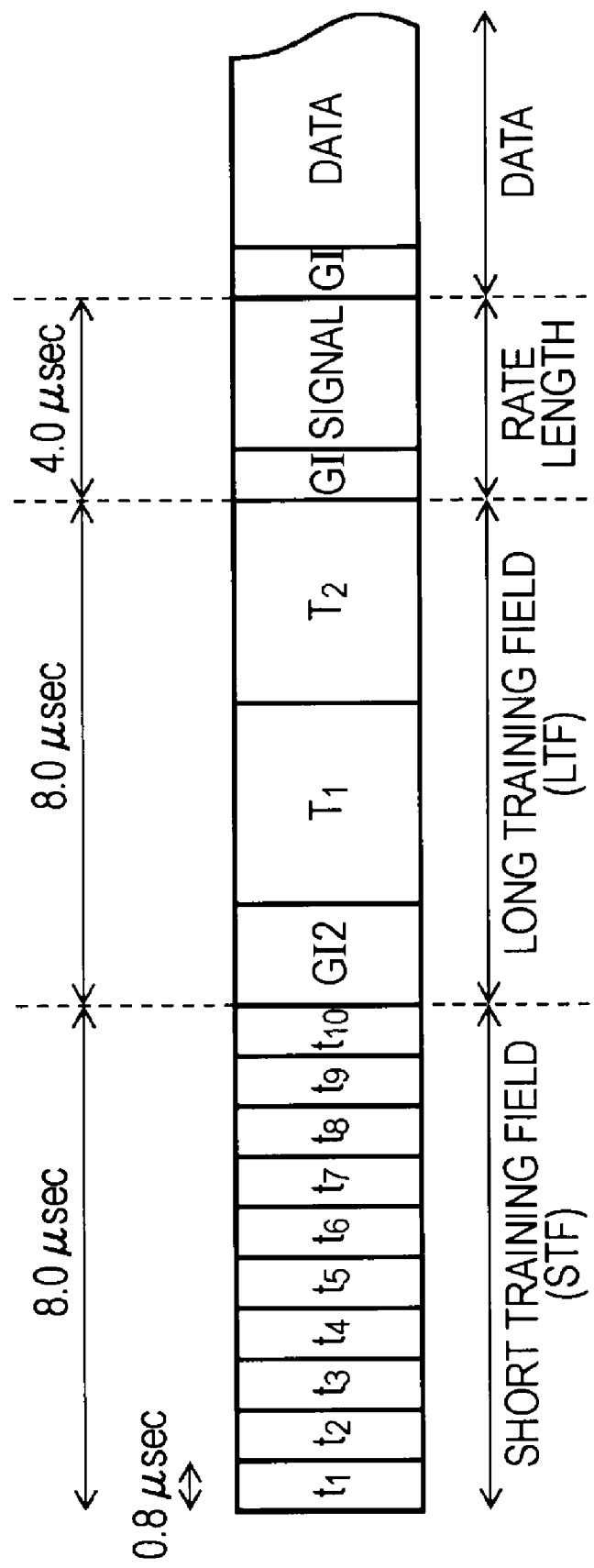
FIG. 16 illustrates a preamble configuration provided by IEEE802.11a/g.
Figure 17:
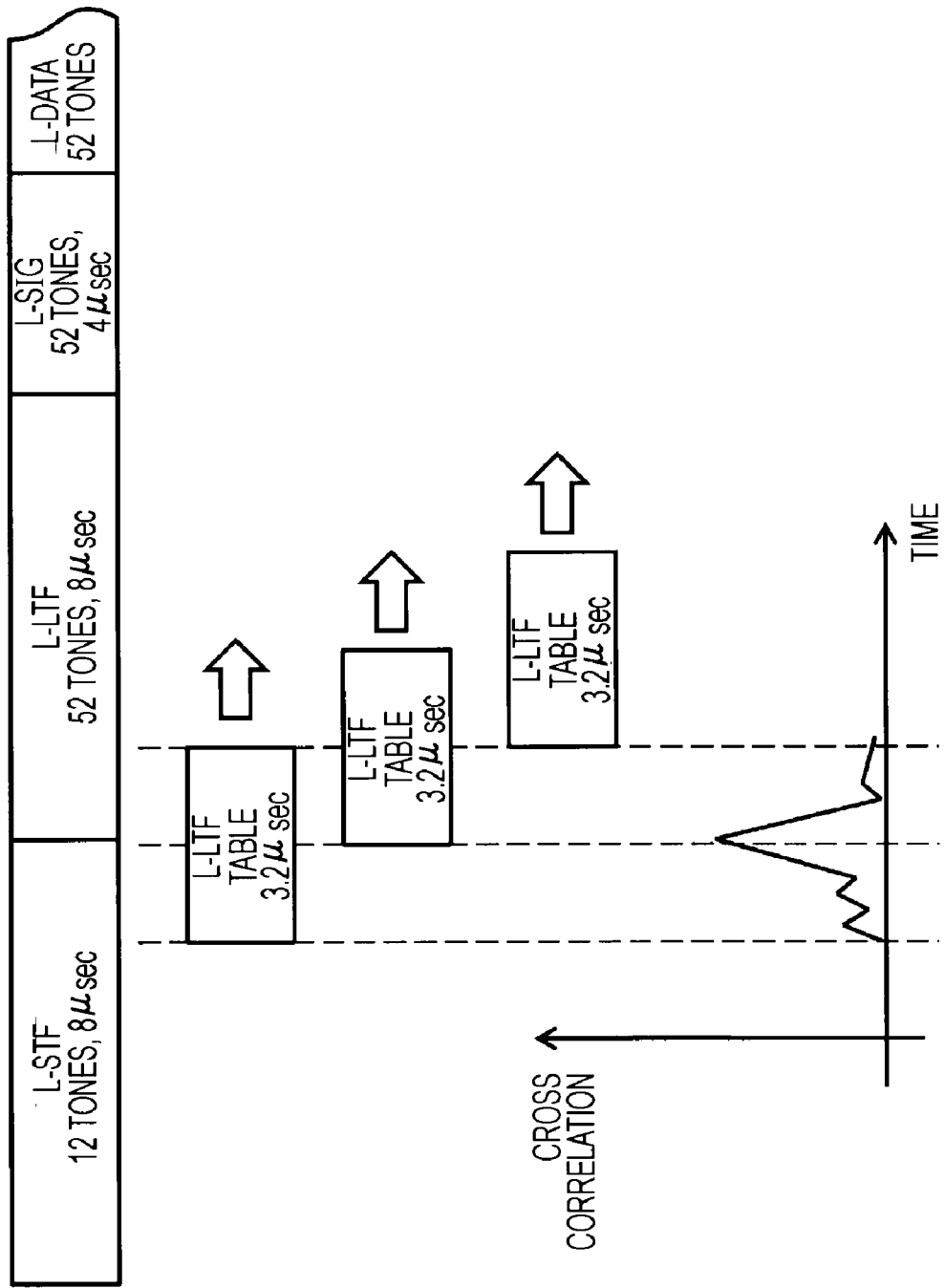
FIG. 17 illustrates a process for detecting exact reception timing through an LTF crosscorrelation operation.

As shown in FIG. 16, the L-LTF consists of 2.5 times of a repetition of known training signals LTS. Two synchronization candidates may be set up and the reception LTF synchronized with two synchronization candidates along the temporal axis direction may be assigned to one reception branch.

The present application contains subject matter related to that disclosed in Japanese Priority Patent Application JP 2008-230451 filed in the Japan Patent Office on Sep. 9, 2008 the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A synchronizing circuit comprising:
   a coarse synchronizing circuit which determines temporary reception timing using a preamble consisting of repetitions of known training signals added to a received packet;
   a synchronization candidate timing control section which sets up multiple synchronization candidates on the basis of the temporary reception timing and controls synchronization of received signals in each of the multiple synchronization candidates, a first, a second, and a third synchronization candidate from the multiple synchronization candidates set at the temporary reception timing minus a predetermined time period, at the temporary reception timing, and at the temporary reception timing plus the predetermined time period, respectively, the first, second, and third synchronization candidates processed at the same time;
   a signal quality monitoring section which monitors signal quality of the received signals synchronized in each of the multiple synchronization candidates; and
   a synchronization candidate selecting section which selects one of the synchronization candidates as final reception timing on the basis of a monitoring result of the signal quality in the signal quality monitoring section.

2. The synchronizing circuit according to claim 1, wherein the coarse synchronizing circuit determines temporary reception timing through autocorrelation of the preamble of the reception packet.

3. The synchronizing circuit according to claim 1, wherein the synchronization candidate selecting section selects a synchronization candidate with the best quality as final reception timing on the basis of predetermined selection criteria.

4. The synchronizing circuit according to claim 1 applied to a receiver with multiple reception branches, wherein:
   the synchronization candidate timing control section assigns, to each of the multiple reception branches, the received signals for which synchronization timing is controlled with each of the multiple synchronization candidates,
   the signal quality monitoring section monitors the signal quality of the received signal in each of the multiple reception branches, and
   the synchronization candidate selecting section selects, as final reception timing, a synchronization candidate corresponding to a reception branch in which the received signal has the best quality based on predetermined selection criteria.

5. The synchronizing circuit according to claim 1, wherein the synchronization candidate timing control section controls synchronization of the preamble of the reception packet with each of the multiple synchronization candidates, and
   the signal quality monitoring section monitors the signal quality for the preamble synchronized with each of the multiple synchronization candidates.

6. The synchronizing circuit according to claim 1, wherein
the signal quality monitoring section estimates each channel matrix from the reception preamble synchronized with each of the multiple synchronization candidates and monitors a matrix norm of an inverse matrix of each channel matrix as the signal quality, and
the synchronization candidate selecting section selects, as the final reception timing, a synchronization candidate used for synchronization of the received signal with the smallest norm.

7. The synchronizing circuit according to claim 1 applied to an orthogonal frequency division multiplexing (OFDM) modulation receiver, wherein:
the signal quality monitoring section monitors, as the signal quality, an amount of phase rotation after a FFT operation of the reception preamble synchronized with each of the multiple synchronization candidates, and
the synchronization candidate selecting section selects, as the final reception timing, a synchronization candidate used for synchronization of the received signal with the smallest amount of phase rotation.

8. The synchronizing circuit according to claim 1, wherein:
the signal quality monitoring section monitors, as the signal quality, a likelihood obtained during decoding of the received signal synchronized with each of the multiple synchronization candidates, and
the synchronization candidate selecting section selects, as the final reception timing, a synchronization candidate used for synchronization of the received signal with the highest likelihood.

9. The synchronizing circuit according to claim 1, wherein:
the signal quality monitoring section monitors, as the signal quality, an error rate before decoding of a known received signal synchronized with each of the multiple synchronization candidates, and
the synchronization candidate selecting section selects, as the final reception timing, a synchronization candidate used for synchronization of the received signal with the lowest error rate.

10. The synchronizing circuit according to claim 1, wherein:
the signal quality monitoring section monitors, as the signal quality, an error rate after decoding of a known received signal synchronized with each of the multiple synchronization candidates, and
the synchronization candidate selecting section selects, as the final reception timing, a synchronization candidate used for synchronization of the received signal with the lowest error rate.

11. The synchronizing circuit according to claim 1, wherein:
the signal quality monitoring section monitors, as the signal quality, noise estimated from the reception preamble synchronized with each of the multiple synchronization candidates, and
the synchronization candidate selecting section selects, as the final reception timing, a synchronization candidate used for synchronization of the received signal with the lowest noise.

12. The synchronizing circuit according to claim 1 applied to an OFDM modulation receiver, wherein:
the preamble of the packet has a 1/N bandwidth of a fast Fourier transform (FFT) operation bandwidth (N is a positive number greater than 2),
the synchronization candidate timing control section sets up M synchronization candidates for each reception branch (M is a positive integer of from 2 to N), controls synchronization timing with each of the multiple synchronization candidates, and shifts frequency of (M−1) received signals so that all of the received signals are arranged within the FFT operation bandwidth and assigned to a single reception branch,
the signal quality monitoring section monitors the signal quality of the received signal after the FFT operation in the reception branch, and
the synchronization candidate selecting section selects, as the final reception timing, a synchronization candidate corresponding to a reception branch in which the received signal has the best quality on the basis of predetermined selection criteria.

13. The synchronizing circuit according to claim 1, wherein:
the preamble used to determine the final reception timing consists of N or more repetitions of known training signals (N is a positive number greater than 2), and
the synchronization candidate timing control section sets up M synchronization candidates for each reception branch (M is a positive integer of from 2 to N), and assigns, to a single reception branch, M received signals in which a preamble of K-th repetition of which synchronization timing is controlled with K-th synchronization candidate (K is a positive integer from 1 to M).

14. A synchronizing method comprising the steps of:
coarse synchronizing to determine temporary reception timing using a preamble consisting of repetition of known training signals added to a reception packet;
controlling synchronization candidate timing to set up multiple synchronization candidates on the basis of the temporary reception timing and controlling synchronization of received signals in each of the multiple synchronization candidates, a first, a second, and a third synchronization candidate from the multiple synchronization candidates set at the temporary reception timing minus a predetermined time period, at the temporary reception timing, and at the temporary reception timing plus the predetermined time period, respectively, the first, second, and third synchronization candidates processed at the same time;
monitoring signal quality of the received signals synchronized in each of the multiple synchronization candidates; and
selecting one of the synchronization candidates as final reception timing on the basis of a monitoring result of the signal quality in the signal quality monitoring section.

15. A wireless communication device comprising:
a reception section which receives a packet with a preamble consisting of repetitions of known training sequences added at the head; and
a synchronizing circuit which includes:
a coarse synchronizing circuit which determines temporary reception timing using a reception preamble,
a synchronization candidate timing control section which sets up multiple synchronization candidates on the basis of the temporary reception timing and controls synchronization of received signals in each of the multiple synchronization candidates, a first, a second, and a third synchronization candidate from the multiple synchronization candidates set at the temporary reception timing minus a predetermined time period, at the temporary reception timing, and at the temporary reception timing plus the predetermined time period, respectively, the first, second, and third synchronization candidates processed at the same time, a signal quality monitoring section which monitors signal quality of the received signals synchronized in each of the multiple synchronization candidates, and a synchronization candidate selecting section which selects one of the synchronization candidates as a final reception timing on the basis of a monitoring result of the signal quality in the signal quality monitoring section, wherein a reception process is conducted in which information signals received after the preamble are synchronized at the final reception timing.

16. A wireless communication method comprising the steps of:

receiving a packet with a preamble consisting of repetitions of known training sequences added at the head;

synchronizing, which includes:

determining temporary reception timing using a reception preamble, setting up multiple synchronization candidates on the basis of the temporary reception timing and controlling synchronization of received signals in each of the multiple synchronization candidates, a first, a second, and a third synchronization candidate from the multiple synchronization candidates set at the temporary reception timing minus a predetermined time period, at the temporary reception timing, and at the temporary reception timing plus the predetermined time period, respectively, the first, second, and third synchronization candidates processed at the same time; and monitoring signal quality of the received signals synchronized in each of the multiple synchronization candidates, and selecting one of the synchronization candidates as a final reception timing on the basis of a monitoring result of the signal quality; and conducting a reception process in which information signals received after the preamble is synchronized at the final reception timing.

17. A non-transitory computer readable storage medium having executable instructions stored therein, which when executed by a processor in a computer causes the processor to execute a method comprising:

determining temporary reception timing using a preamble consisting of repetitions of known training signals added to a reception packet;

setting up multiple synchronization candidates on the basis of the temporary reception timing and controls synchronization of received signals in each of the multiple synchronization candidates, a first, a second, and a third synchronization candidate from the multiple synchronization candidates set at the temporary reception timing minus a predetermined time period, at the temporary reception timing, and at the temporary reception timing plus the predetermined time period, respectively, the first, second, and third synchronization candidates processed at the same time;

monitoring signal quality of the received signals synchronized in each of the multiple synchronization candidates; and selecting one of the synchronization candidates as final reception timing on the basis of a monitoring result of the signal quality in the signal quality monitoring section.

18. A synchronizing circuit comprising:

a coarse synchronizing circuit which determines temporary reception timing using a preamble consisting of repetitions of known training signals added to a received packet;

a synchronization candidate timing control section which sets up multiple synchronization candidates on the basis of the temporary reception timing and controls synchronization of received signals in each of the multiple synchronization candidates;

a signal quality monitoring section which monitors signal quality of the received signals synchronized in each of the multiple synchronization candidates; and a synchronization candidate selecting section which selects one of the synchronization candidates as final reception timing on the basis of a monitoring result of the signal quality in the signal quality monitoring section, wherein the signal quality monitoring section estimates each channel matrix from the reception preamble synchronized with each of the multiple synchronization candidates and monitors a matrix norm of an inverse matrix of each channel matrix as the signal quality, and the synchronization candidate selecting section selects, as the final reception timing, a synchronization candidate used for synchronization of the received signal with the smallest norm.

19. A synchronizing circuit comprising:

a coarse synchronizing circuit which determines temporary reception timing using a preamble consisting of repetitions of known training signals added to a received packet;

a synchronization candidate timing control section which sets up multiple synchronization candidates on the basis of the temporary reception timing and controls synchronization of received signals in each of the multiple synchronization candidates;

a signal quality monitoring section which monitors signal quality of the received signals synchronized in each of the multiple synchronization candidates; and a synchronization candidate selecting section which selects one of the synchronization candidates as final reception timing on the basis of a monitoring result of the signal quality in the signal quality monitoring section, wherein the synchronizing circuit is applied to an orthogonal frequency division multiplexing (OFDM) modulation receiver, the signal quality monitoring section monitors, as the signal quality, an amount of phase rotation after a FFT operation of the reception preamble synchronized with each of the multiple synchronization candidates, and the synchronization candidate selecting section selects, as the final reception timing, a synchronization candidate used for synchronization of the received signal with the smallest amount of phase rotation.

20. A synchronizing circuit comprising:

a coarse synchronizing circuit which determines temporary reception timing using a preamble consisting of repetitions of known training signals added to a received packet;

a synchronization candidate timing control section which sets up multiple synchronization candidates on the basis of the temporary reception timing and controls synchronization of received signals in each of the multiple synchronization candidates;

a signal quality monitoring section which monitors signal quality of the received signals synchronized in each of the multiple synchronization candidates; and a synchronization candidate selecting section which selects one of the synchronization candidates as final reception timing on the basis of a monitoring result of the signal quality in the signal quality monitoring section, wherein the synchronizing circuit is applied to an OFDM modulation receiver, the preamble of the packet has a 1/N bandwidth of a fast Fourier transform (FFT) operation bandwidth (N is a positive number greater than 2), the synchronization candidate timing control section sets up M synchronization candidates for each reception branch (M is a positive integer of from 2 to N), controls synchronization timing with each of the multiple synchronization candidates, and shifts frequency of (M−1) received signals so that all of the received signals are arranged within the FFT operation bandwidth and assigned to a single reception branch, the signal quality monitoring section monitors the signal quality of the received signal after the FFT operation in the reception branch, and the synchronization candidate selecting section selects, as the final reception timing, a synchronization candidate corresponding to a reception branch in which the received signal has the best quality on the basis of predetermined selection criteria.

\* \* \* \* \*